US011738779B2

(12) United States Patent
Urano et al.

(10) Patent No.: US 11,738,779 B2
(45) Date of Patent: *Aug. 29, 2023

(54) AUTONOMOUS DRIVING VEHICLE SYSTEM

(71) Applicant: TOYOTA JIDOSHA KABUSHIKI KAISHA, Toyota (JP)

(72) Inventors: Hiromitsu Urano, Numazu (JP); Kentaro Ichikawa, Shizuoka-ken (JP); Taisuke Sugaiwa, Susono (JP); Toshiki Kindo, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 63 days.

This patent is subject to a terminal disclaimer.

(21) Appl. No.: 17/514,613

(22) Filed: Oct. 29, 2021

(65) Prior Publication Data

US 2022/0048508 A1  Feb. 17, 2022

Related U.S. Application Data

(63) Continuation of application No. 16/845,260, filed on Apr. 10, 2020, now Pat. No. 11,260,868, which is a (Continued)

(30) Foreign Application Priority Data

Jan. 19, 2015 (JP) .................................. 2015-008141

(51) Int. Cl.
*B60W 30/18* (2012.01)
*B60W 30/182* (2020.01)
(Continued)

(52) U.S. Cl.
CPC .......... *B60W 30/182* (2013.01); *B60W 50/10* (2013.01); *G05D 1/0061* (2013.01);
(Continued)

(58) Field of Classification Search
CPC ............... B60W 30/182; B60W 50/10; B60W 2540/10; B60W 2540/12; B60W 2540/18;
(Continued)

(56) References Cited

U.S. PATENT DOCUMENTS 8,527,199 B1   9/2013  Burnette et al.
8,670,891 B1 *  3/2014  Szybalski .............. B62D 1/286
                                                                701/23
(Continued)

FOREIGN PATENT DOCUMENTS

JP   2012051441 A   3/2012
JP   5382218 B2   10/2013
(Continued)

OTHER PUBLICATIONS

Notice of Allowance dated Nov. 2, 2021 issued in U.S. Appl. No. 16/845,260.
(Continued)

*Primary Examiner* — Michael V Kerrigan
(74) *Attorney, Agent, or Firm* — Sughrue Mion, PLLC

(57) ABSTRACT

A system includes an acquisition unit that acquires an operation amount or a duration count, and a switching unit that switches a driving state. The switching unit switches the driving state to the cooperative driving state when the operation amount is equal to or greater than an intervention threshold and less than a start threshold or the duration count is equal to or greater than a first threshold and less than a second threshold during the autonomous driving state, switches the driving state to the autonomous driving state when the operation amount is less than the intervention threshold or the duration count is less than the first threshold during the cooperative driving state, and switches the driving state to the manual driving state when the operation amount is equal to or greater than the start threshold or the (Continued)

duration count is equal to or greater than the second threshold.

20 Claims, 14 Drawing Sheets

Related U.S. Application Data continuation of application No. 15/805,544, filed on Nov. 7, 2017, now Pat. No. 10,654,482, which is a continuation of application No. 15/000,467, filed on Jan. 19, 2016, now Pat. No. 9,845,096.

(51) Int. Cl.
    *B60W 50/10*     (2012.01)
    *G05D 1/00*     (2006.01)
    *G05D 1/02*     (2020.01)

(52) U.S. Cl.
    CPC ......... *G05D 1/0088* (2013.01); *G05D 1/0278* (2013.01); *B60W 2540/10* (2013.01); *B60W 2540/12* (2013.01); *B60W 2540/18* (2013.01); *B60W 2540/215* (2020.02); *B60W 2900/00* (2013.01); *G05D 2201/0213* (2013.01)

(58) Field of Classification Search
    CPC ........ B60W 2540/215; B60W 2900/00; G05D 1/0061; G05D 1/0088; G05D 1/0278; G05D 2201/0213; G05D 1/02; G05D 1/0214; G05D 1/0223; G05D 1/0251; G05D 1/0257
    See application file for complete search history.

(56) References Cited

U.S. PATENT DOCUMENTS

| | | |
|---|---|---|
| 9,845,096 B2 | 12/2017 | Urano et al. |
| 10,654,482 B2 | 5/2020 | Urano et al. |
| 2013/0110343 A1 | 5/2013 | Ichikawa et al. |
| 2013/0211656 A1 | 8/2013 | An et al. |
| 2014/0244096 A1 | 8/2014 | An et al. |
| 2015/0134204 A1 | 5/2015 | Kunihiro et al. |
| 2016/0207538 A1 | 7/2016 | Urano |
| 2016/0280235 A1 | 9/2016 | Sugaiwa et al. |
| 2016/0280236 A1 | 9/2016 | Otsuka |
| 2017/0017233 A1 | 1/2017 | Ichikawa et al. |
| 2018/0065635 A1 | 3/2018 | Urano |
| 2020/0238993 A1 | 7/2020 | Urano |

FOREIGN PATENT DOCUMENTS

| | | |
|---|---|---|
| JP | 2016175613 A | 10/2016 |
| JP | 2016175614 A | 10/2016 |
| JP | 201719436 A | 1/2017 |
| WO | 2014/165681 A1 | 10/2014 |

OTHER PUBLICATIONS

Office Action dated Apr. 18, 2023 issued in U.S. Appl. No. 17/566,041.
JP 2012 051441 Masahiro et al. (see attached PDF machine translation provided by Espacenet). published Mar. 15, 2012 (Year: 2012).
JP2011 131838 Masahiro et al. (see attached PDF machine translation provided by Espacenet). published Jul. 7, 2011 (Year: 2011).
Urano, Hiromitsu et al., U.S. Appl. No. 16/845,260, filed Apr. 10, 2020.
Urano, Hiromitsu et al., U.S. Appl. No. 15/805,544, filed Nov. 7, 2017.
Urano, Hiromitsu et al., U.S. Appl. No. 15/000,467, filed Jan. 19, 2016.
Notice of Allowance dated Aug. 15, 2017, which issued during the prosecution of U.S. Appl. No. 15/000,467.
Notice of Allowance dated Jan. 14, 2020, which issued during the prosecution of U.S. Appl. No. 15/805,544.

\* cited by examiner

AUTONOMOUS DRIVING VEHICLE SYSTEM

CROSS-REFERENCE TO RELATED APPLICATIONS

This application is a continuation of U.S. application Ser. No. 16/845,260, filed Apr. 10, 2020, which is a continuation of U.S. application Ser. No. 15/805,544, filed Nov. 7, 2017 (now U.S. Pat. No. 10,654,482 issued May 19, 2020), which is a continuation of U.S. application Ser. No. 15/000,467, filed Jan. 19, 2016 (now U.S. Pat. No. 9,845,096 issued Dec. 19, 2017), which claims benefit of priority of Japanese Patent Application No. 2015-008141, filed on Jan. 19, 2015. The entire disclosures of the prior applications including the specification, drawings and abstract are incorporated herein by reference in their entirety.

BACKGROUND

1. Technical Field

The present disclosure relates to an autonomous driving vehicle system.

2. Description of Related Art

U.S. Pat. No. 8,527,199 describes a vehicle system which performs autonomous driving of a vehicle. The vehicle system controls the vehicle using any one of an autonomous driving mode, a partial autonomous driving mode, and a non-autonomous driving mode.

On the other hand, in the vehicle system of the related art, it is considered that a driver performs switching among the three modes using a switch or the like. In this case, the driver operates the switch when the temporary intervention of the driver is required while the vehicle is controlled in the autonomous driving mode, and the driver needs to operate the switch in switching from the partial autonomous driving mode or the non-autonomous driving mode to the autonomous driving mode after the intervention ends. For this reason, the driver may feel burdened.

SUMMARY

Exemplary aspects of the present disclosure provide an autonomous driving vehicle system capable of reducing a burden given to a driver when the driver temporarily intervenes in a vehicle in an autonomous driving state.

An autonomous driving vehicle system according to an aspect of the present disclosure includes a peripheral information detection unit configured to detect peripheral information of the vehicle; a traveling plan generation unit configured to generate a traveling plan along a target route set in advance on a map based on the peripheral information detected by the peripheral information detection unit and map information; a driving operation information acquisition unit configured to acquire an operation amount of a driving operation of a driver relating to at least one of a steering operation, an accelerator operation, and a brake operation of the vehicle or a duration count according to a duration of the driving operation; and a driving state switching unit configured to, based on the operation amount or the duration count, switch among an autonomous driving state where the traveling of the vehicle is controlled using the traveling plan, a cooperative driving state where the vehicle is allowed to travel in cooperation with the driving operation based on the traveling plan and the operation amount, and a manual driving state where the operation amount is reflected in the traveling of the vehicle. The driving state switching unit switches the driving state to the cooperative driving state when the driving state is the autonomous driving state and when the operation amount is equal to or greater than an intervention determination threshold value and less than a manual driving start threshold value or the duration count is equal to or greater than a first threshold value and less than a second threshold value, and when the driving state is the cooperative driving state, switches the driving state to the autonomous driving state when the operation amount is less than the intervention determination threshold value or the duration count is less than the first threshold value, and switches the driving state to the manual driving state when the operation amount is equal to or greater than the manual driving start threshold value or the duration count is equal to or greater than the second threshold value.

In the autonomous driving vehicle system according to the aspect of the present disclosure, the driving is switched to one of the autonomous driving state, the manual driving state, and the cooperative driving state based on the operation amount of the driving operation or the duration count according to the duration of the driving operation. For example, when an oncoming vehicle of a heavy vehicle type appears during traveling in the autonomous driving state, the driver may perform a driving operation so as to travel at a position slightly distanced from the heavy vehicle. In this case, when the operation amount is equal to or greater than the intervention determination threshold value and less than the manual driving start threshold value or the duration count is equal to or greater than the first threshold value and less than the second threshold value, the driving state is switched to the cooperative driving state by the driving state switching unit. When the driver stops the driving operation after having passed the oncoming vehicle, the driving state is switched to the autonomous driving state by the driving state switching unit. For this reason, the autonomous driving vehicle system can reduce a burden given to the driver when the driver temporarily intervenes in the vehicle in the autonomous driving state.

In the above-described aspect, when a steering wheel of the vehicle rotates according to a control target value of the steering wheel included in the traveling plan, the driving operation information acquisition unit may acquire the difference between a rotation state detection value of the steering wheel of the vehicle and the control target value of the steering wheel included in the traveling plan as an operation amount of the steering operation. Alternatively, when a pedal position of an accelerator pedal of the vehicle moves according to a control target value of the accelerator pedal included in the traveling plan, the driving operation information acquisition unit may acquire the difference between a pedal position detection value of the accelerator pedal of the vehicle and the control target value of the accelerator pedal included in the traveling plan as an operation amount of the accelerator operation. Alternatively, when a pedal position of a brake pedal of the vehicle moves according to a control target value of the brake pedal included in the traveling plan, the driving operation information acquisition unit may acquire the difference between a pedal position detection value of the brake pedal of the vehicle and the control target value of the brake pedal included in the traveling plan as an operation amount of the brake operation.

In this case, even when the steering wheel rotates according to the control target value or the pedal position of the accelerator pedal or the brake pedal moves, the driving operation information acquisition unit can acquire the operation amount of the driver.

In the above-described aspect, when the driving state is the manual driving state, the driving state switching unit may maintain the driving state in the manual driving state even when the operation amount is less than the manual driving start threshold value or the duration count is less than the second threshold value. In this case, the autonomous driving vehicle system does not perform switching to the autonomous driving state when the driver performs a driving operation in a sufficient operation amount with the intention of continuing the manual driving state or the driving operation is sufficiently continued; therefore, it is possible to reduce a burden in switching the driving state given to the driver who desires to continue the manual driving state.

In the above-described aspect, the autonomous driving vehicle system may further include an input unit configured to input a request operation of autonomous driving start of the driver, and the driving state switching unit may maintain the driving state in the manual driving state until the request operation is input to the input unit when the driving state is the manual driving state. In this case, the autonomous driving vehicle system does not perform switching to the autonomous driving state until the driver requests to start autonomous driving; therefore, it is possible to reduce a burden in switching the driving state given to the driver who desires to continue the manual driving state.

In the above-described aspect, after the driving state of the vehicle is switched from the autonomous driving state to the cooperative driving state, when the operation amount is less than the intervention determination threshold value but is equal to or greater than a predetermined threshold value, or the duration count is less than the first threshold value but is equal to or greater than a third threshold value, the driving state switching unit may maintain the driving state in the cooperative driving state. In this case, the autonomous driving vehicle system can avoid frequent switching of the driving state when the operation amount is substantially equal to the intervention determination threshold value or the duration count is substantially equal to the first threshold value.

In the above-described aspect, when the driving states corresponding to the operation amounts of two or more of the steering operation, the accelerator operation, and the brake operation of the vehicle are different or the driving states corresponding to the duration counts of two or more of the steering operation, the accelerator operation, and the brake operation of the vehicle are different, the driving state switching unit may give priority to maintaining the cooperative driving state over switching the driving state of the vehicle in the cooperative driving state to the autonomous driving state, and may give priority to switching to the manual driving state over maintaining the driving state of the vehicle in the cooperative driving state.

In this case, for example, when the driver performs the steering operation and the accelerator operation, and when the driver performs the steering operation with the intention of switching to the manual driving state and performs the temporary accelerator operation, the autonomous driving vehicle system can avoid switching to the autonomous driving state based on the release of the accelerator operation.

In the above-described aspect, when the driving state of the vehicle is the cooperative driving state, cooperative driving may be performed using a value obtained by weighting the operation amount and the control target value based on the traveling plan, and a weight of weighting when the operation amount is equal to or greater than a determination threshold value may be different from the weight of weighting when the operation amount is less than the determination threshold value. In this case, the autonomous driving vehicle system can change the degree of system intervention in the cooperative driving state.

According to the above-described aspect, it is possible to reduce a burden given to the driver when the driver temporarily intervenes in the vehicle in the autonomous driving state.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
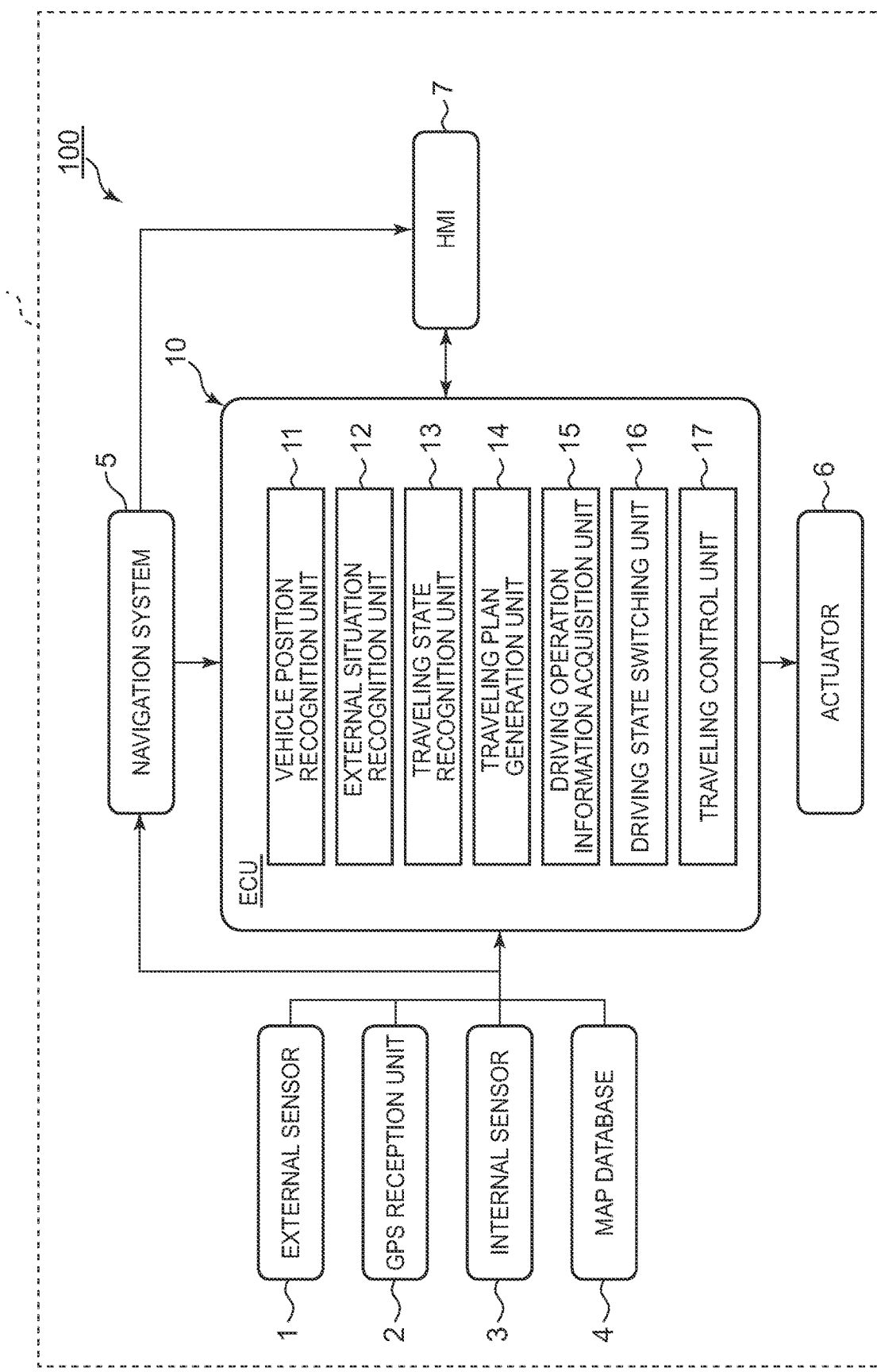
FIG. 1 is a block diagram showing the configuration of an autonomous driving vehicle system according to an embodiment.

Hereinafter, exemplary embodiments of the present disclosure will be described referring to the drawings. In the following description, the same elements or corresponding elements are represented by the same reference numerals, and overlapping description will be omitted.

First Embodiment

Figure 2:
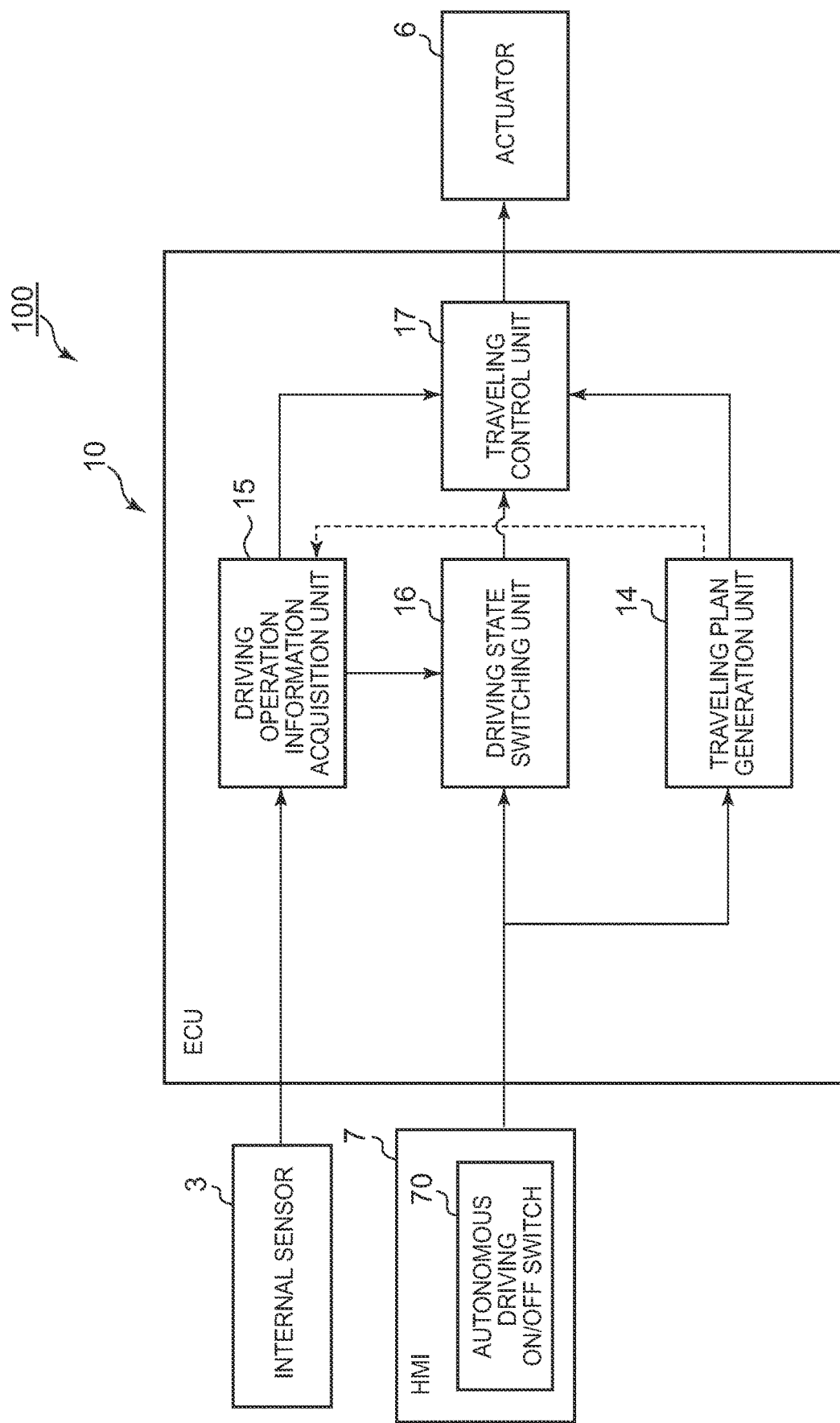
FIG. 2 is a block diagram illustrating an ECU of FIG. 1.

FIG. 1 is a block diagram showing the configuration of an autonomous driving vehicle system 100 according to a first embodiment. FIG. 2 is a block diagram illustrating an electronic control unit (ECU) 10 in the autonomous driving vehicle system 100 of FIG. 1. As shown in FIG. 1, the autonomous driving vehicle system 100 is mounted in a vehicle V, such as a passenger car. The autonomous driving vehicle system 100 includes an external sensor (peripheral information detection unit) 1, a global positioning system (GPS) reception unit 2, an internal sensor 3, a map database 4, a navigation system 5, an actuator 6, a human machine interface (HMI) 7, and an ECU 10.

The external sensor 1 is a device which detects an external situation as peripheral information of the vehicle V. The external sensor 1 includes at least one of a camera, a radar, and a laser imaging detection and ranging (LIDAR).

The camera is a device which images the external situation of the vehicle V. The camera is provided, for example, in the inside of a windshield of the vehicle V. The camera may be a monocular camera or a stereo camera. The stereo camera has, for example, two imaging units which are arranged so as to reproduce binocular parallax. Imaging information of the stereo camera includes, for example, information of a depth direction. The camera outputs imaging information relating to the external situation of the vehicle V to the ECU 10. The camera may have two or more imaging units.

The radar detects an object outside the vehicle V using an electric wave (for example a radio wave). An electric wave is, for example, a millimeter wave. The radar transmits an electric wave to the periphery of the vehicle V and receives an electric wave reflected by the object to detect the object. The radar can output, for example, the distance or direction to the object as object information. The radar outputs the detected object information to the ECU 10. When sensor fusion (a method of integrally processing a plurality of kinds of sensor information to improve detection accuracy) is performed at a subsequent stage, reception information of the reflected electric wave may be output to the ECU 10.

The LIDAR detects an object outside the vehicle V using light. The LIDAR transmits light to the periphery of the vehicle V and receives light reflected by the object to measure the distance to the reflection point and to detect the object. The LIDAR can output, for example, the distance or direction to the object as object information. The LIDAR outputs the detected object information to the ECU 10. When sensor fusion is performed at a subsequent stage, reception information of reflected light may be output to the ECU 10. The external sensor 1 is not necessarily provided with a plurality of cameras, radars, or LIDARs.

The GPS reception unit 2 receives signals from three or more GPS satellites to acquire positional information indicating the position of the vehicle V. The positional information includes, for example, a latitude and a longitude. The GPS reception unit 2 outputs the measured positional information of the vehicle V to the ECU 10. Instead of the GPS reception unit 2, other means capable of specifying the latitude and longitude of the vehicle V may be used.

The internal sensor 3 is a detector which detects information according to a traveling state of the vehicle V and information (driving operation information) according to a driving operation of the driver of the vehicle V. The internal sensor 3 includes at least one of a vehicle speed sensor, an acceleration sensor, and a yaw rate sensor in order to detect information according to the traveling state of the vehicle V. Furthermore, the internal sensor 3 includes at least one of an accelerator pedal sensor, a brake pedal sensor, and a steering sensor in order to detect driving operation information.

The vehicle speed sensor is a detector which detects the speed of the vehicle V. As the vehicle speed sensor, for example, a wheel speed sensor which is provided in a wheel of the vehicle V or a drive shaft rotating integrally with the wheel and detects the rotation speed of the wheel is used. The vehicle speed sensor outputs vehicle speed information (wheel speed information) including the speed of the vehicle V to the ECU 10.

The acceleration sensor is a detector which detects the acceleration of the vehicle V. The acceleration sensor includes, for example, a longitudinal acceleration sensor which detects the longitudinal acceleration of the vehicle V, and a lateral acceleration sensor which detects the lateral acceleration of the vehicle V. The acceleration sensor outputs acceleration information including the acceleration of the vehicle V to the ECU 10.

The yaw rate sensor is a detector which detects a yaw rate (rotation angular velocity) around a vertical axis of the center of gravity of the vehicle V. As the yaw rate sensor, for example, a gyro sensor can be used. The yaw rate sensor outputs yaw rate information including the yaw rate of the vehicle V to the ECU 10.

The accelerator pedal sensor is, for example, a detector which detects the depression amount of the accelerator pedal. The depression amount of the accelerator pedal is the position (pedal position) of the accelerator pedal based on a predetermined position. The predetermined position may be a fixed position or may be a position changed by a predetermined parameter. The accelerator pedal sensor is provided in, for example, a shaft portion of the accelerator pedal of the vehicle V. The accelerator pedal sensor outputs operation information according to the depression amount of the accelerator pedal to the ECU 10. When the pedal position of the accelerator pedal moves according to a control target value of the accelerator pedal included in a traveling plan described below, the accelerator pedal sensor detects a pedal position in which both the accelerator pedal operation and the system control input are reflected. When the pedal position of the accelerator pedal does not move according to a control target value of the accelerator pedal included in a traveling plan described below, the accelerator pedal sensor detects a pedal position according to the accelerator pedal operation.

The brake pedal sensor is, for example, a detector which detects the depression amount of the brake pedal. The depression amount of the brake pedal is, for example, the position (pedal position) of the brake pedal based on a predetermined position. The predetermined position may be a fixed position or may be a position changed by a predetermined parameter. The brake pedal sensor is provided in, for example, a portion of a brake pedal. The brake pedal sensor may detect the operation force (the depression force to the brake pedal, the pressure of a master cylinder, or the like) of the brake pedal. The brake pedal sensor outputs operation information according to the depression amount or operation force of the brake pedal to the ECU 10. When the pedal position of the brake pedal moves according to a control target value of the brake pedal included in a traveling plan described below, the brake pedal sensor detects a pedal position in which both the brake pedal operation and the system control input are reflected. When the pedal position of the brake pedal does not move according to a control target value of the brake pedal included in a traveling plan described below, the brake pedal sensor detects a pedal position according to a brake pedal operation.

The steering sensor is, for example, a detector which detects the rotation state of the steering wheel. A detection value of the rotation state is, for example, steering torque or a steering angle. The steering sensor is provided in, for example a steering shaft of the vehicle V. The steering sensor outputs steering information including steering torque or the steering angle of the steering wheel to the ECU 10. When the steering wheel rotates according to a control target value of the steering wheel included in a traveling plan described below, the steering sensor detects steering torque or a steering angle in which both the steering operation and the system control input are reflected. When the steering wheel does not rotate according to a control target value of the steering wheel included in a traveling plan described below, the steering sensor detects steering torque or a steering angle according to the steering operation.

The map database 4 is a database which includes map information. The map database 4 may be formed in, for example, a hard disk drive (HDD) mounted in the vehicle V. The map information includes, for example, positional information of roads, information of road shapes, and positional information of intersections and junctions. Information of road shapes includes, for example, classifications of curves and straight portions, curvatures of curves, and the like. Furthermore, when the autonomous driving vehicle system 100 uses positional information of shield structures, such as buildings or walls, or a simultaneous localization and mapping (SLAM) technique, an output signal of the external sensor 1 may be included in the map information. The map database 4 may be stored in a computer of a facility, such as an information processing center communicable with the vehicle V.

The navigation system 5 is a device which performs guidance to a destination set on a map by the driver of the vehicle V for the driver of the vehicle V. The navigation system 5 calculates a traveling route of the vehicle V based on the positional information of the vehicle V measured by the GPS reception unit 2 and the map information of the map database 4. The route may be, for example, a route where a traveling lane of the vehicle V is specified in a multi-lane section. The navigation system 5 calculates, for example, a target route from the position of the vehicle V to the destination, and notifies the driver of the target route by the display on a display and speech output of a speaker. The navigation system 5 outputs, for example, information of the target route of the vehicle V to the ECU 10. The navigation system 5 may use information stored in a computer of a facility, such as an information processing center communicable with the vehicle V. Alternatively, part of the processing performed by the navigation system 5 may be performed by the computer of the facility.

The actuator 6 is a device which executes traveling control of the vehicle V. The actuator 6 includes at least a throttle actuator, a brake actuator, and a steering actuator. The throttle actuator controls the supply amount (throttle opening) of air to an engine according to a control signal from the ECU 10 and controls a drive force of the vehicle V. When the vehicle V is a hybrid vehicle or an electric vehicle, the throttle actuator is not included, and a control signal from the ECU 10 is input to a motor as a power source and the drive force is controlled.

The brake actuator controls a brake system according to a control signal from the ECU 10 and controls a drive force provided to the wheel of the vehicle V. As the brake system, for example, a hydraulic brake system can be used. The steering actuator controls the driving of an assist motor controlling steering torque in an electric power steering system according to a control signal from the ECU 10. With this, the steering actuator controls steering torque of the vehicle V.

The HMI 7 is an interface for output and input of information between an occupant (including the driver) of the vehicle V and the autonomous driving vehicle system 100. The HMI 7 includes, for example, a display panel for displaying image information to the occupant, a speaker for speech output, and operation buttons or a touch panel for an input operation of the occupant. As shown in FIG. 2, the HMI 7 includes an autonomous driving ON/OFF switch 70 which is an input unit configured to input a start request operation of autonomous driving start by the occupant. The autonomous driving ON/OFF switch 70 may be configured such that an end request operation relating to autonomous driving end can be input by the occupant. If a request operation relating to autonomous driving start or end is performed by the occupant, the autonomous driving ON/OFF switch 70 outputs information indicating autonomous driving start or autonomous driving end to the ECU 10. The input unit is not limited to a switch, and any input unit may be used as long as information determining the driver's intention of autonomous driving start or end can be input. For example, the input unit may be an autonomous driving start button and an autonomous driving end button, or may be objects of switches or buttons displayed on a screen operable by the driver. When the vehicle arrives at the destination where autonomous driving ends, the HMI 7 notifies the occupant of arrival at the destination. The HMI 7 may output information to the occupant using a portable information terminal connected in a wireless manner or may receive an input operation of the occupant using the portable information terminal. Furthermore, the HMI 7 may output a notification to the occupant indicating which of three states of an autonomous driving state, a cooperative driving state, and a manual driving state the vehicle is currently in.

The ECU 10 shown in FIGS. 1 and 2 controls autonomous traveling of the vehicle V. The ECU 10 is an electronic control unit having a central processing unit (CPU), a read only memory (ROM), a random access memory (RAM), and the like. The ECU 10 loads programs stored in the ROM to the RAM and executes the programs on the CPU, thereby executing various kinds of control. The ECU 10 may be constituted of a plurality of electronic control units.

As shown in FIGS. 1 and 2, the ECU 10 includes a vehicle position recognition unit 11, an external situation recognition unit 12, a traveling state recognition unit 13, a traveling plan generation unit 14, a driving operation information acquisition unit 15, a driving state switching unit 16, and a traveling control unit 17.

The vehicle position recognition unit 11 recognizes the position (hereinafter, referred to as "vehicle position") of the vehicle V on the map based on the positional information of the vehicle V received by the GPS reception unit 2 and the map information of the map database 4. The vehicle position recognition unit 11 may acquire and recognize the vehicle position used in the navigation system 5 from the navigation system 5. When the vehicle position of the vehicle V can be measured by a sensor provided on the outside, such as a road, the vehicle position recognition unit 11 may acquire the vehicle position from the sensor by communication.

The external situation recognition unit 12 recognizes the external situation of the vehicle V based on the detection result of the external sensor 1. The detection result includes, for example, the imaging information of the camera, the object information of the radar, the object information of the LIDAR, or the like. The external situation may include, for example, the position of a white line or the position of the lane center of a traveling lane of the vehicle V and a road width, and a shape of a road. A shape of a road may be, for example, a curvature of a traveling lane, a change in gradient of a road surface effective for prospective estimation of the external sensor 1, undulation, or the like. The external situation may be a situation of an object, such as an obstacle in the periphery of the vehicle V. A situation of an object includes, for example, information for distinguishing between a fixed obstacle and a moving obstacle, the position of an obstacle with respect to the vehicle V, a moving direction of an obstacle with respect to the vehicle V, a relative speed of an obstacle with respect to the vehicle V, or the like. The external situation recognition unit 12 may compare the detection result of the external sensor 1 with the map information and may correct the position and direction of the vehicle V acquired by the GPS reception unit 2 or the like to increase accuracy.

The traveling state recognition unit 13 recognizes the traveling state of the vehicle V based on the detection result of the internal sensor 3. The detection result of the internal sensor 3 includes, for example, the vehicle speed information of the vehicle speed sensor, the acceleration information of the acceleration sensor, the yaw rate information of the yaw rate sensor, and the like. Information indicating the traveling state of the vehicle V includes, for example, a vehicle speed, an acceleration, or a yaw rate.

The traveling plan generation unit 14 generates a route of the vehicle V based on, for example, the target route calculated by the navigation system 5, the vehicle position recognized by the vehicle position recognition unit 11, and the external situation (including the vehicle position and direction) of the vehicle V recognized by the external situation recognition unit 12. The route is a traveling locus of the vehicle V in the target route. The traveling plan generation unit 14 generates the route such that the vehicle V travels on the target route while satisfying the standards, such as safety, compliance, and traveling efficiency. Furthermore, the traveling plan generation unit 14 generates the route of the vehicle V so as to avoid contact with an object based on the situation of an object in the periphery of the vehicle V.

The target route described in this specification includes a traveling route which is automatically generated based on the external situation or the map information when setting of a destination is not explicitly performed by the driver, like a road traveling route in a "driving assistance device described in Japanese Patent No. 5382218 (WO2011/158347) or an "autonomous driving device" described in Japanese Patent Application Publication No. 2011-162132.

The traveling plan generation unit 14 generates a traveling plan according to the generated route. That is, the traveling plan generation unit 14 generates a traveling plan according to the target route set in advance on the map based on at least one of the external situation as the peripheral information of the vehicle V and the map information of the map database 4. The traveling plan generation unit 14 generates a traveling plan including a plurality of sets having two elements, the two elements comprising a target position p in a coordinate system fixed to the vehicle V indicating the route of the vehicle V, and a target speed v at the target position. That is, the traveling plan generation unit 14 may generate a traveling plan including a plurality of configuration coordinates (p, v). Each of a plurality of target positions p has at least the position of the x coordinate or the y coordinate in a coordinate system fixed to the vehicle V, or information equivalent to the position of the x coordinate or the y coordinate. The traveling plan may include information indicating the behavior of the vehicle V, and is not limited to a plan including the configuration coordinates. For example, the traveling plan may include a target time t, instead of the target speed v, as information indicating the behavior of the vehicle V, or may include the target time t and information relating to the direction of the vehicle V at this time.

In general, the traveling plan is sufficient with data indicating a plan from the current time to the future by several seconds ahead. However, there is a case where data indicating a plan up to tens of seconds ahead is required depending on a situation, such as a right turn at an intersection or passing of the vehicle V. Assuming this case, the number of configuration coordinates of the traveling plan may be variable, and the distance between the configuration coordinates may be variable. Furthermore, a curve connecting adjacent configuration coordinates may be approximated using a spline function or the like, and the parameters of the approximated curve may be set as a traveling plan. A method of generating a traveling plan may represent the behavior of the vehicle V, and an arbitrary well known method can be employed, for example.

The traveling plan includes, for example, a target control value when the autonomous driving vehicle system 100 performs vehicle control. For example, the traveling plan may be set as data indicating changes in the vehicle speed of the vehicle V, the acceleration/deceleration, steering torque of the steering wheel, and the like when the vehicle V travels along the route following the target route. That is, the traveling plan may include a speed pattern of the vehicle V, an acceleration/deceleration pattern, and a steering torque pattern. Alternatively, the traveling plan may be set as data indicating changes in the control target value of the accelerator pedal and the control target value of the brake pedal, instead of the speed pattern of the vehicle V and the acceleration/deceleration pattern. The traveling plan generation unit 14 may generate a traveling plan such that a travel time (a required time until the vehicle V arrives at the destination) is the shortest.

The speed pattern is, for example, data having a target vehicle speed set in association with the time for each target control position with respect to target control positions set at a predetermined interval (for example, 1 m) on a route. The acceleration/deceleration pattern is, for example, data having a target acceleration/deceleration set in association with the time for each target control position with respect to target control positions set at a predetermined interval (for example, 1 m) on a route. The steering pattern is, for example, data having target steering torque set in association with the time for each target control position with respect to target control positions set at a predetermined interval (for example, 1 m) on a route. Data indicating changes in the control target value of the accelerator pedal and the control target value of the brake pedal is, for example, data having the pedal position set in association with the time for each target control position with respect to target control positions set at a predetermined interval (for example, 1 m) on a route.

For example, when information indicating autonomous driving start is acquired from the autonomous driving ON/OFF switch 70, the traveling plan generation unit 14 generates a traveling plan. The traveling plan generation unit 14 outputs the generated traveling plan to the driving operation information acquisition unit 15 and the traveling control unit 17. When the driving operation information acquisition unit 15 does not need to use the traveling plan, for example, as described below, when the state of the driving operation can be acquired only using the detection value of the internal sensor 3, the traveling plan generation unit 14 may not output the traveling plan to the driving operation information acquisition unit 15.

The driving operation information acquisition unit 15 acquires driving operation information, which is information according to the driving operation of the driver, based on the detection result of the internal sensor 3. For example, the driving operation information acquisition unit 15 acquires the operation amount of the driving operation relating to at least one of the steering operation, the accelerator operation, and the brake operation of the vehicle V as the driving operation information. The steering operation is, for example, the rotation operation of the steering wheel by the driver. That is, the driving operation information relating to the steering operation includes the operation amount (steering torque or steering angle) of the steering wheel. When the steering wheel of the vehicle V rotates according to the control target value (target steering torque) of the steering wheel included in the traveling plan, the driving operation information acquisition unit 15 acquires the difference between a rotation state detection value of the steering wheel of the vehicle V detected by the steering sensor and the control target value of the steering wheel included in the traveling plan generated by the traveling plan generation unit 14 as the operation amount of the steering operation. Since it should suffice that deviation from the control target value can be detected, for example, the difference between a differential value of the rotation state detection value and a differential value of the control target value may be used. When the steering wheel does not rotate according to the control target value of the steering wheel included in the traveling plan, the driving operation information acquisition unit 15 acquires the rotation state detection value of the steering wheel of the vehicle V detected by the steering sensor as the operation amount of the steering operation. In any case, the driving operation information acquisition unit 15 may acquire the absolute value of the operation amount of the driver. The accelerator operation is, for example, the depression operation of the accelerator pedal by the driver. That is, driving operation information relating to the accelerator operation includes information according to the operation amount (depression amount) of the accelerator pedal. The brake operation is, for example, the depression operation of the brake pedal by the driver. That is, driving operation information relating to the brake pedal operation includes information according to the operation amount (depression amount) of the brake pedal. In regard to the accelerator operation and the brake operation, similar to the steering operation described above, when the pedal position is changed according to a system control value, the difference between the detection value and the control target value is calculated and the absolute value of the operation amount of the driver is acquired. That is, when the pedal position of the accelerator pedal of the vehicle V moves according to the control target value of the accelerator pedal included in the traveling plan, the driving operation information acquisition unit 15 acquires the difference between the pedal position detection value of the accelerator pedal of the vehicle V and the control target value of the accelerator pedal included in the traveling plan as the operation amount of the accelerator operation. The control target value of the accelerator pedal may be derived from the vehicle speed of the vehicle V, the acceleration/deceleration, or the like included in the traveling plan. Similarly, when the pedal position of the brake pedal of the vehicle V moves according to the control target value of the brake pedal included in the traveling plan, the driving operation information acquisition unit 15 acquires the difference between the pedal position detection value of the brake pedal of the vehicle V and the control target value of the brake pedal included in the traveling plan as the operation amount of the brake operation. The control target value of the brake pedal may be derived from the vehicle speed of the vehicle V, the acceleration/deceleration, or the like included in the traveling plan. The driving operation information acquisition unit 15 outputs the driving operation information to the driving state switching unit 16 and the traveling control unit 17.

The driving state switching unit 16 switches the driving state of the vehicle V based on the driving operation information acquired by the driving operation information acquisition unit 15. Hereinafter, a case where the driving state switching unit 16 switches the driving state of the vehicle V based on the operation amount of the steering operation as an example of the driving operation will be described.

Figure 3:
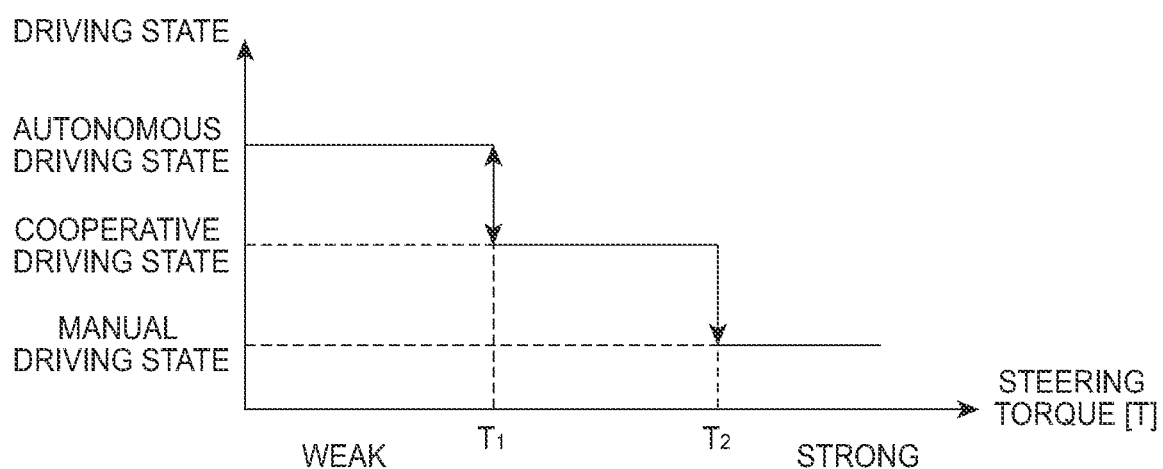
FIG. 3 is a diagram illustrating an example of the relationship between torque of a steering operation and transition of a driving state of a vehicle.

FIG. 3 is a diagram illustrating an example of the relationship between the operation amount of the steering operation and transition of the driving state of the vehicle V. FIG. 3 shows a case where the operation amount of the steering operation is the steering torque as an example. The horizontal axis of FIG. 3 represents steering torque [T], and the vertical axis represents a driving state. As shown in FIG. 3, the driving state of the vehicle V includes three states of an autonomous driving state, a cooperative driving state, and a manual driving state.

The autonomous driving state is, for example, a state where traveling of the vehicle V is controlled using the traveling plan. That is, the autonomous driving state is, for example, a state where the driver does not perform the steering operation and traveling of the vehicle V is realized only by the control of the autonomous driving vehicle system 100 in a state where there is no intervention of the driver. The cooperative driving state is, for example, a driving state where the vehicle V is allowed to travel in cooperation with the steering operation based on the traveling plan and the operation amount of the steering operation. That is, the cooperative driving state is a state where both the driver and the autonomous driving vehicle system 100 can be involved in traveling of the vehicle V and a state where traveling of the vehicle V is realized based on at least the operation amount of the steering operation of the driver in a state where system intervention is possible. The manual driving state is a state where the operation amount of the steering operation of the driver is reflected in traveling of the vehicle V. That is, the manual driving state is a state where the operation amount of the steering operation of the driver is reflected in traveling of the vehicle V in a state where system intervention is not possible.

The driving state switching unit 16 switches among the autonomous driving state, the cooperative driving state, and the manual driving state based on steering torque according to the steering operation. When steering torque according to the steering operation is less than an intervention determination threshold value $T_1$, the driving state of the vehicle V becomes the autonomous driving state. The intervention determination threshold value $T_1$ is a value set in advance, and a threshold value for determining the presence or absence of operation intervention of the driver. In the first embodiment, the intervention determination threshold value $T_1$ is a threshold value which is used in order to determine switching from the autonomous driving state to the cooperative driving state. When steering torque according to the steering operation is equal to or greater than the intervention determination threshold value $T_1$ and less than a manual driving start threshold value $T_2$, the driving state of the vehicle V becomes the cooperative driving state. The manual driving start threshold value $T_2$ is a value set in advance, and a threshold value for determining switching from the cooperative driving state to the manual driving state. When steering torque according to the steering operation is equal to or greater than the manual driving start threshold value $T_2$, the driving state of the vehicle V becomes the manual driving state.

Next, the determination (maintenance or transition) of the driving state of the vehicle V will be described. First, the maintenance or transition of the autonomous driving state will be described. The driving state switching unit 16 maintains the driving state of the vehicle V in the autonomous driving state when the driving state of the vehicle V is the autonomous driving state and when steering torque according to the steering operation is less than the intervention determination threshold value $T_1$. With this, for example, even when a steering operation not intending the release of autonomous driving is detected, for example, even when the driver touches the steering wheel unintentionally, or the like, the autonomous driving state is not released. For this reason, the driving state switching unit 16 can avoid the operation of the autonomous driving ON/OFF switch 70 of the driver in order to instruct autonomous driving start each time the driver releases autonomous driving unintentionally; therefore, it is possible to reduce a burden given to the driver.

The driving state switching unit 16 switches the driving state of the vehicle V to the cooperative driving state when the driving state of the vehicle V is the autonomous driving state and when steering torque according to the steering operation is equal to or greater than the intervention determination threshold value $T_1$ and less than the manual driving start threshold value $T_2$. With this, for example, when the driver operates the steering wheel in an operation amount equal to or greater than the intervention determination threshold value $T_1$ and less than the manual driving start threshold value $T_2$ in order to intervene in the vehicle in the autonomous driving state, the driving state of the vehicle V transitions from the autonomous driving state to the cooperative driving state. For example, when an oncoming vehicle of a heavy vehicle type appears during traveling in the autonomous driving state, and when the driver performs a steering operation so as to temporarily travel at a position slightly distanced from the heavy vehicle, the driving state of the vehicle V is switched to the cooperative driving state by the driving state switching unit 16. In this case, since the vehicle V travels based on the steering operation of the driver in a state where system intervention is possible, the autonomous driving vehicle system 100 can allow the vehicle V to travel at a position based on the steering operation of the driver.

The driving state switching unit 16 may switch the driving state of the vehicle V to the manual driving state when the driving state of the vehicle V is the autonomous driving state and when steering torque according to the steering operation is equal to or greater than the manual driving start threshold value $T_2$. That is, the driving state of the vehicle V may directly transition from the autonomous driving state to the manual driving state without passing through the cooperative driving state.

Next, the maintenance or transition of the cooperative driving state will be described. The driving state switching unit 16 switches the driving state of the vehicle V from the cooperative driving state to the autonomous driving state when the driving state of the vehicle V is the cooperative driving state and when steering torque according to the steering operation is less than the intervention determination threshold value $T_1$. With this, for example, when the driver performs the steering operation such that the vehicle V travels at a position slightly distanced from a heavy vehicle as an oncoming vehicle and the driver stops the steering operation after having passed the oncoming vehicle, the driving state of the vehicle V is switched from the cooperative driving state to the autonomous driving state by the driving state switching unit 16. In this way, when operation intervention is temporary, the driving state is automatically switched to the autonomous driving state based on steering torque according to the steering operation. Therefore, since the driving state switching unit 16 can avoid having the driver operate the autonomous driving ON/OFF switch 70 in order to instruct autonomous driving start each time temporary autonomous driving is released, it is possible to reduce a burden given to the driver.

The driving state switching unit 16 maintains the cooperative driving state when the driving state of the vehicle V is the cooperative driving state and when steering torque according to the steering operation is maintained equal to or greater than the intervention determination threshold value $T_1$ and less than the manual driving start threshold value $T_2$. At this time, the total operation amount of the control target value based on the traveling plan and the operation amount of the driver may be reflected in traveling of the vehicle V, or the total operation amount of an operation amount smaller than the control target value based on the traveling plan and the operation amount of the driver may be reflected in traveling of the vehicle V. The operation amount smaller than the control target value based on the traveling plan includes 0. When the operation amount smaller than the control target value based on the traveling plan is 0, steering torque according to the steering operation of the driver is reflected in traveling of the vehicle V in a state where system intervention is possible. The driving state switching unit 16 switches the driving state of the vehicle V from the cooperative driving state to the manual driving state when the driving state of the vehicle V is the cooperative driving state and when steering torque according to the steering operation is equal to or greater than the manual driving start threshold value $T_2$. With this, steering torque according to the steering operation of the driver is reflected in traveling of the vehicle V in a state where system intervention is not possible.

Next, the maintenance or transition of the manual driving state will be described. When the driving state of the vehicle V is the manual driving state, the driving state switching unit 16 maintains the driving state of the vehicle V in the manual driving state even when steering torque according to the steering operation becomes less than the manual driving start threshold value $T_2$. In this case, when the driver performs the steering operation in a sufficient operation amount with the intention of continuing the manual driving state, switching to the autonomous driving state or the cooperative driving state is limited subsequently, for example switching to the autonomous driving state or the cooperative driving state is prohibited or restricted; therefore, it is possible to eliminate the need for the driver to operate the autonomous driving ON/OFF switch 70 in order to instruct autonomous driving end. For this reason, it is possible to reduce a burden given to the driver.

The driving state switching unit 16 maintains the manual driving state until the request operation of autonomous driving start is input to the autonomous driving ON/OFF switch 70 when the driving state of the vehicle V is the manual driving state. That is, even when steering torque becomes less than the manual driving start threshold value $T_2$, switching to the cooperative driving state or the autonomous driving state is limited until the request operation of autonomous driving start is input. The period during which the manual driving state is maintained is not limited to the period described above, and for example, the driving state switching unit 16 may maintain the manual driving state in a period determined in advance. The input of the request operation of autonomous driving start is not limited to the autonomous driving ON/OFF switch 70, and known input means can be used.

As described above referring to FIG. 3, a transition between the autonomous driving state and the cooperative driving state is determined by comparing the intervention determination threshold value $T_1$ with the steering torque based on the steering operation, and as indicated by an arrow in FIG. 3, is a reversible transition. While a transition between the cooperative driving state and the manual driving state is determined by comparing the manual driving start threshold value $T_2$ with the steering torque based on the steering operation, as indicated by an arrow in FIG. 3, transition between the cooperative driving state and the manual driving state is an irreversible transition where only transition from the cooperative driving state to the manual driving state is permitted. The driving state switching unit 16 outputs information relating to the driving state to the traveling control unit 17.

The traveling control unit 17 allows the vehicle V to travel in the driving state determined by the driving state switching unit 16. If the driving state of the vehicle V is the autonomous driving state, the traveling control unit 17 outputs a control signal to the actuator 6 based on the traveling plan generated by the traveling plan generation unit 14, and controls traveling of the vehicle V. If the driving state of the vehicle V is the cooperative driving state, the traveling control unit 17 outputs a control signal to the actuator 6 based on the traveling plan generated by the traveling plan generation unit 14 and steering torque according to the steering operation acquired by the driving operation information acquisition unit 15, and allows the vehicle V to travel in cooperation with the steering operation. If the driving state of the vehicle V is the manual driving state, the traveling control unit 17 outputs a control signal to the actuator 6 based on steering torque according to the steering operation acquired by the driving operation information acquisition unit 15, and reflects steering torque according to the steering operation in traveling of the vehicle V. With this, the traveling control unit 17 realizes the three states of the autonomous driving state, the cooperative driving state, and the manual driving state.

Figure 4:
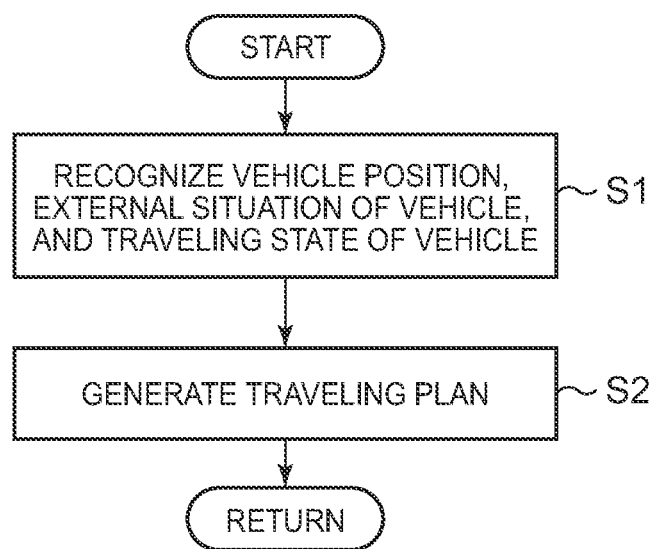
FIG. 4 is a flowchart illustrating an example of traveling plan generation processing.

Next, processing which is performed by the autonomous driving vehicle system 100 will be described. FIG. 4 is a flowchart showing an example of traveling plan generation processing. Control processing shown in FIG. 4 is executed, for example, when the request operation of autonomous driving start is input to the autonomous driving ON/OFF switch 70.

As shown in FIG. 4, first, the vehicle position recognition unit 11 recognizes the vehicle position from the positional information of the vehicle V received by the GPS reception unit 2 and the map information of the map database 4. The external situation recognition unit 12 recognizes the external situation of the vehicle V from the detection result of the external sensor 1. The traveling state recognition unit 13 recognizes the traveling state of the vehicle V from the detection result of the internal sensor 3 (S1). The traveling plan generation unit 14 generates the traveling plan of the vehicle V from the target route of the navigation system 5, the vehicle position, the external situation of the vehicle V, and the traveling state of the vehicle V (S2). In this way, the traveling plan of the vehicle V is generated.

Figure 5:
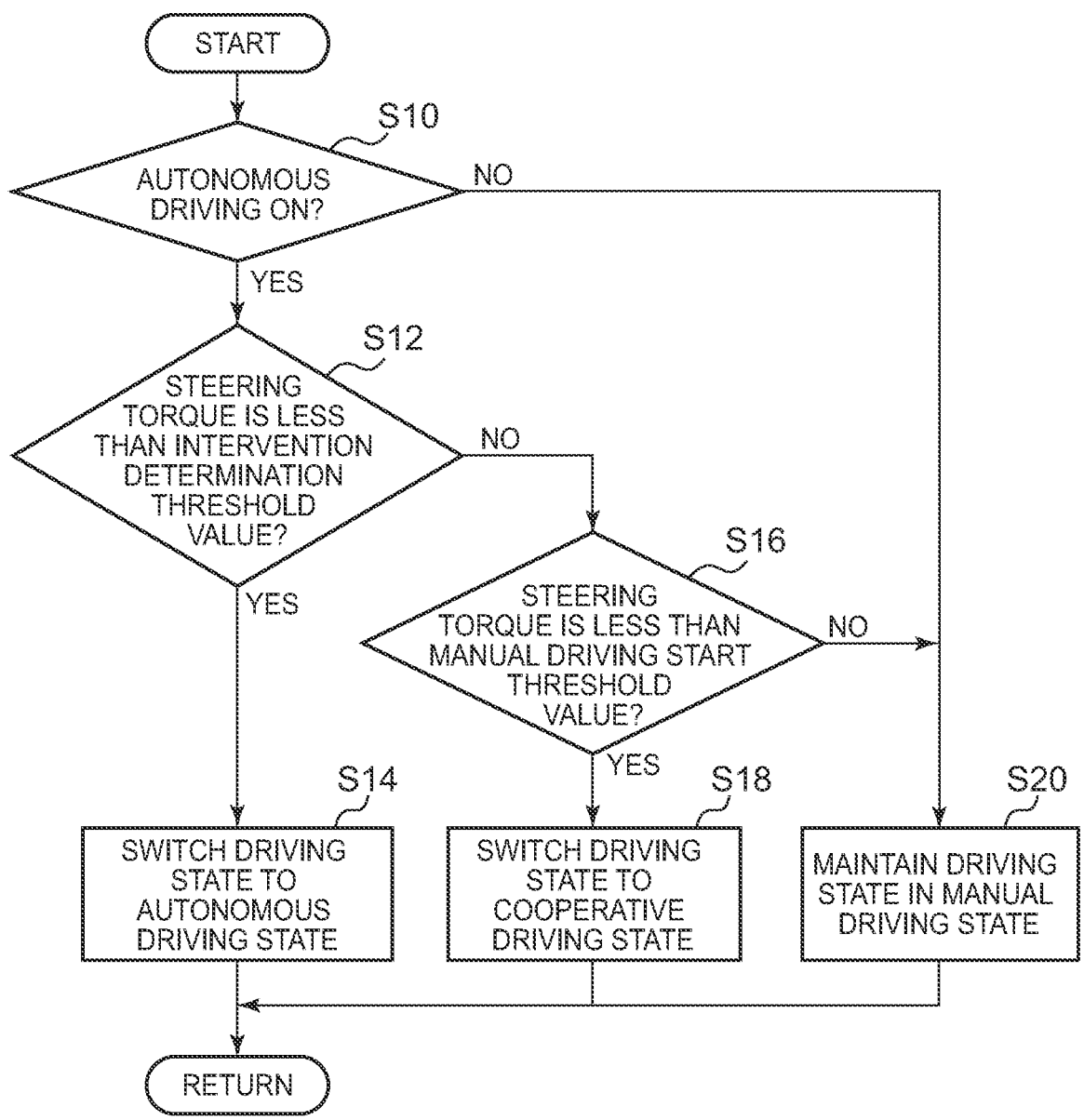
FIG. 5 is a flowchart illustrating an example of switching processing for switching a driving state of a vehicle in a manual driving state using steering torque.

Next, switching processing of the driving state of the vehicle V which is performed by the autonomous driving vehicle system 100 will be described. FIG. 5 is a flowchart illustrating an example of switching processing for switching the driving state of the vehicle V in the manual driving state using steering torque according to the steering operation. Control processing shown in FIG. 5 is repeatedly executed at a predetermined cycle when the vehicle V is in the manual driving state.

As shown in FIG. 5, first, the driving state switching unit 16 determines whether or not the request operation of autonomous driving start is input to the autonomous driving ON/OFF switch 70 when the driving state of the vehicle V is the manual driving state (S10). When it is determined that the request operation of autonomous driving start is input to the autonomous driving ON/OFF switch 70, the driving state switching unit 16 performs determination processing (S12) using the intervention determination threshold value $T_1$.

The driving state switching unit 16 determines whether or not steering torque based on the detection result of the internal sensor 3 is less than the intervention determination threshold value $T_1$ as determination processing using the intervention determination threshold value $T_1$ shown in S12. When it is determined that steering torque based on the detection result of the internal sensor 3 is less than the intervention determination threshold value $T_1$, the driving state switching unit 16 switches the driving state of the vehicle V to the autonomous driving state (S14). If the switching processing shown in S14 ends, the flowchart shown in FIG. 5 ends. The driving state of the vehicle V transitions from the manual driving state to the autonomous driving state, and is no longer in the manual driving state which is a prerequisite for the flowchart shown in FIG. 5; therefore, processing for repeating the flowchart shown in FIG. 5 is not performed subsequently, and a flowchart shown in FIG. 6 described below is started.

When it is determined that steering torque based on the detection result of the internal sensor 3 is not less than the intervention determination threshold value $T_1$, the driving state switching unit 16 performs determination processing (S16) using the manual driving start threshold value $T_2$. The driving state switching unit 16 determines whether or not steering torque based on the detection result of the internal sensor 3 is less than the manual driving start threshold value $T_2$ as the determination processing using the manual driving start threshold value $T_2$ shown in S16. When it is determined that steering torque based on the detection result of the internal sensor 3 is less than the manual driving start threshold value $T_2$, the driving state switching unit 16 switches the driving state of the vehicle V to the cooperative driving state (S18). If the switching processing shown in S18 ends, the flowchart shown in FIG. 5 ends. The driving state of the vehicle V transitions from the manual driving state to the cooperative driving state, and is no longer in the manual driving state which is a prerequisite for the flowchart shown in FIG. 5; therefore, processing for repeating the flowchart shown in FIG. 5 is not performed subsequently, and a flowchart shown in FIG. 6 described below is started.

When it is determined that steering torque based on the detection result of the internal sensor 3 is not less than the manual driving start threshold value $T_2$, the driving state switching unit 16 maintains the manual driving state (S20). Similarly, when it is determined that the request operation of autonomous driving start is not input to the autonomous driving ON/OFF switch 70, the driving state switching unit 16 maintains the manual driving state (S20). Then, the flowchart shown in FIG. 5 ends. Since the driving state does not transition out of the manual driving state, the flowchart shown in FIG. 5 is repeatedly executed subsequently.

Figure 6:
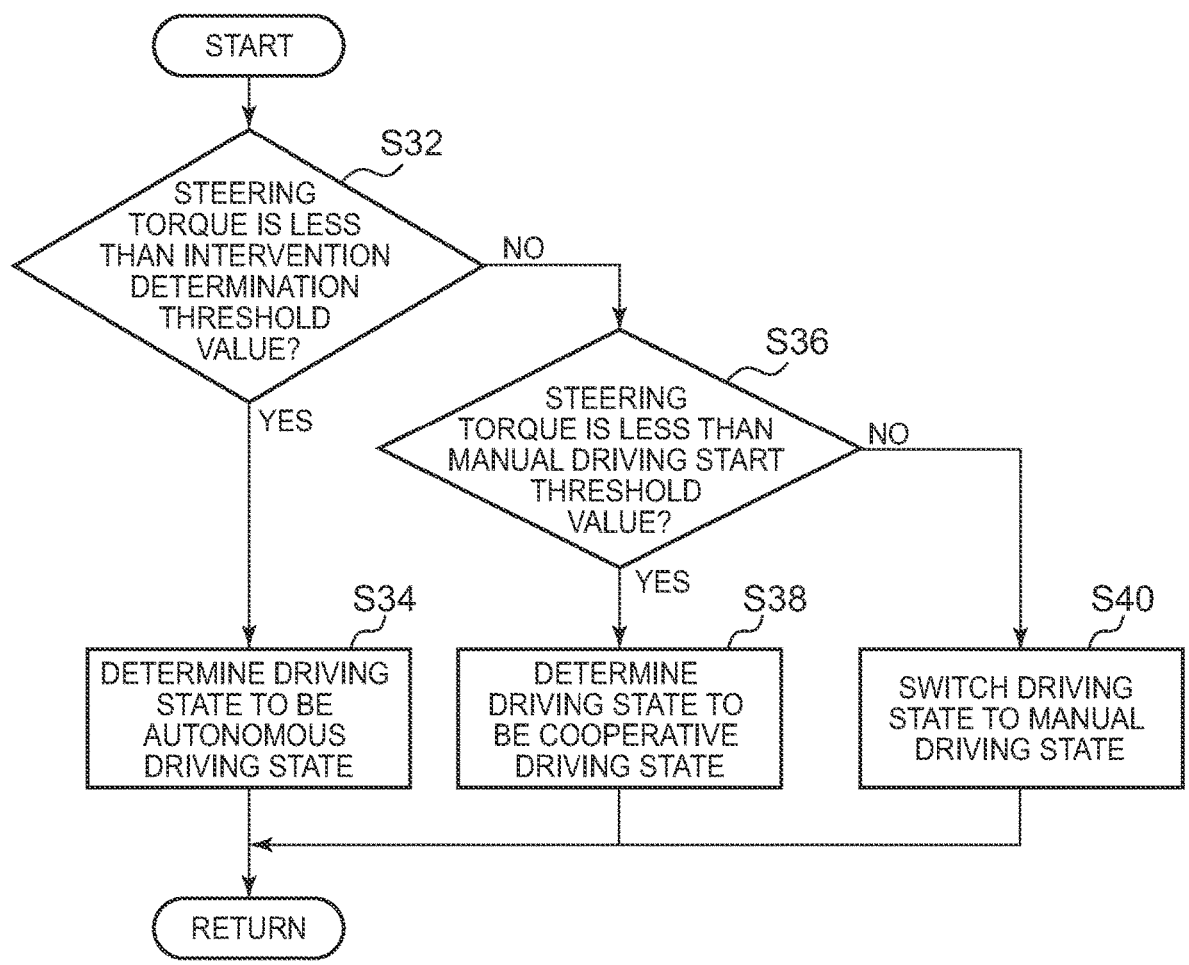
FIG. 6 is a flowchart illustrating an example of switching processing for switching a driving state of a vehicle in an autonomous driving state or a cooperative driving state using steering torque.

Next, switching processing of the driving state of the vehicle V which is performed by the autonomous driving vehicle system 100 when the driving state of the vehicle V is the autonomous driving state or the cooperative driving state will be described. FIG. 6 is a flowchart illustrating an example of switching processing for switching the driving state of the vehicle V in the autonomous driving state or the cooperative driving state using steering torque. Control processing shown in FIG. 6 is repeatedly executed at a predetermined cycle when the vehicle V is in the autonomous driving state or the cooperative driving state.

As shown in FIG. 6, first, the driving state switching unit 16 determines whether or not steering torque based on the detection result of the internal sensor 3 is less than the intervention determination threshold value $T_1$ as the determination processing using the intervention determination threshold value $T_1$ shown in S32. When it is determined that steering torque based on the detection result of the internal sensor 3 is less than the intervention determination threshold value $T_1$, the driving state switching unit 16 determines the driving state of the vehicle V to be the autonomous driving state (S34). That is, the driving state switching unit 16 maintains the autonomous driving state when the driving state of the vehicle V is the autonomous driving state, and switches the driving state to the autonomous driving state when the driving state of the vehicle V is the cooperative driving state. If the processing shown in S34 ends, the flowchart shown in FIG. 6 ends. Since the driving state of the vehicle V does not transition to the manual driving state, the flowchart shown in FIG. 6 is repeatedly executed subsequently.

When it is determined that steering torque based on the detection result of the internal sensor 3 is not less than the intervention determination threshold value $T_1$, the driving state switching unit 16 performs the determination processing (S36) using the manual driving start threshold value $T_2$. The driving state switching unit 16 determines whether or not steering torque based on the detection result of the internal sensor 3 is less than the manual driving start threshold value $T_2$ as the determination processing using the manual driving start threshold value $T_2$ shown in S36. When it is determined that steering torque based on the detection result of the internal sensor 3 is less than the manual driving start threshold value $T_2$, the driving state switching unit 16 determines the driving state of the vehicle V to be the cooperative driving state (S38). That is, the driving state switching unit 16 switches the driving state to the cooperative driving state when the driving state of the vehicle V is the autonomous driving state, and maintains the cooperative driving state when the driving state of the vehicle V is the cooperative driving state. If the processing shown in S38 ends, the flowchart shown in FIG. 6 ends. Since the driving state of the vehicle V does not transition to the manual driving state, the flowchart shown in FIG. 6 is repeatedly executed subsequently.

When it is determined that steering torque based on the detection result of the internal sensor 3 is not less than the manual driving start threshold value $T_2$, the driving state switching unit 16 switches the driving state to the manual driving state (S40). Then, the flowchart shown in FIG. 6 ends. The driving state of the vehicle V transition from the autonomous driving state or the cooperative driving state to the manual driving state, and is no longer in the autonomous driving state or the cooperative driving state which is a prerequisite for the flowchart shown in FIG. 6; therefore, the flowchart shown in FIG. 6 is not repeatedly performed subsequently, and the flowchart shown in FIG. 5 is started.

As shown in FIGS. 5 and 6, the autonomous driving state, the cooperative driving state, and the manual driving state are switched based on steering torque according to the steering operation by the driving state switching unit 16. In FIGS. 5 and 6, although a case where, when the driving state is the autonomous driving state and the cooperative driving state, the request operation of autonomous driving end is input after the request operation of autonomous driving start is input to the autonomous driving ON/OFF switch 70 is not shown, in this case, the driving state switching unit 16 performs processing for switching from the autonomous driving state and the cooperative driving state to the manual driving state.

In the above description, although a case where the driving state switching unit 16 switches the driving state of the vehicle V based on the operation amount (steering torque) of the steering operation as an example of the driving operation has been described, steering torque may be replaced with a steering angle, or may be replaced with the depression amount (pedal position) of the accelerator pedal or the brake pedal. That is, the driving state switching unit 16 may switch the driving state of the vehicle V based on the steering angle of the steering operation, or may switch the driving state of the vehicle V based on the depression amount of the accelerator pedal or the brake pedal.

In the autonomous driving vehicle system 100 according to the first embodiment, the driving state of the vehicle V is switched to one of the autonomous driving state, the manual driving state, and the cooperative driving state based on the operation amount of the driving operation. For example, when an oncoming vehicle of a heavy vehicle type appears during traveling in the autonomous driving state, the driving state of the vehicle V is switched to the cooperative driving state by the driving state switching unit 16 when the driver performs the driving operation such that the vehicle travels at a position slightly distanced from the heavy vehicle, and when the operation amount is equal to or greater than the intervention determination threshold value $T_1$ and less than the manual driving start threshold value $T_2$. When the driver stops the driving operation after having passed the oncoming vehicle, the driving state of the vehicle V is switched to the autonomous driving state by the driving state switching unit 16. For this reason, the autonomous driving vehicle system 100 can reduce a burden given to the driver when the driver temporarily intervenes in the vehicle V in the autonomous driving state.

In the autonomous driving vehicle system 100 according to the first embodiment, when the steering wheel of the vehicle V rotates according to the control target value of the steering wheel included in the traveling plan, the driving operation information acquisition unit 15 can acquire the difference between the rotation state detection value of the steering wheel of the vehicle V and the control target value of the steering wheel included in the traveling plan as the operation amount of the steering operation. When the pedal position of the accelerator pedal of the vehicle V moves according to the control target value of the accelerator pedal included in the traveling plan, the driving operation information acquisition unit 15 can acquire the difference between the pedal position detection value of the accelerator pedal of the vehicle V and the control target value of the accelerator pedal included in the traveling plan as the operation amount of the accelerator operation. When the pedal position of the brake pedal of the vehicle V moves according to the control target value of the brake pedal included in the traveling plan, the driving operation information acquisition unit 15 can acquire the difference between the pedal position detection value of the brake pedal of the vehicle V and the control target value of the brake pedal included in the traveling plan as the operation amount of the brake operation. That is, even when the steering wheel rotates according to the control target value or the pedal position of the accelerator pedal or the brake pedal moves, the driving operation information acquisition unit 15 can acquire the operation amount of the driver. In other words, even when the system operates the operating unit of the driver, the driving operation information acquisition unit 15 can acquire the operation amount of the driving operation of the driver to the operating unit.

In the autonomous driving vehicle system 100 according to the first embodiment, when the driving state of the vehicle V is the manual driving state, the driving state switching unit 16 can maintain the driving state in the manual driving state even when the operation amount is less than the manual driving start threshold value. The autonomous driving vehicle system 100 does not perform switching to the autonomous driving state when the driver performs the driving operation in a sufficient operation amount with the intention of continuing the manual driving state or the driving operation is sufficiently continued; therefore, it is possible to reduce a burden in switching the driving state given to the driver who desires to continue the manual driving state.

The autonomous driving vehicle system 100 according to the first embodiment further includes the autonomous driving ON/OFF switch 70 which is provided to input the request operation of autonomous driving start of the driver, and the driving state switching unit 16 can maintain the driving state of the vehicle V in the manual driving state until the request operation is input to the autonomous driving ON/OFF switch 70 when the driving state of the vehicle V is the manual driving state. Accordingly, the autonomous driving vehicle system 100 does not perform switching to the autonomous driving state until there is a request of autonomous driving start from the driver; therefore, it is possible to reduce a burden in switching the driving state given to the driver who desires to continue the manual driving state.

Second Embodiment

Next, an autonomous driving vehicle system according to a second embodiment will be described. In the description of this embodiment, description of the same configuration and processing as in the first embodiment will not be repeated, and the difference from the first embodiment will be described.

The autonomous driving vehicle system according to this embodiment has the same configuration as the autonomous driving vehicle system 100 according to the first embodiment, and only the functions of the driving operation information acquisition unit 15 and the driving state switching unit 16 of the ECU 10 are different.

The driving operation information acquisition unit 15 acquires a duration count according to a duration of the driving operation of the driver relating to at least one of the steering operation, the accelerator operation, and the brake operation of the vehicle V as driving operation information. The duration of the driving operation is the time when an operation amount equal to or greater than a predetermined threshold value is continued. For example, when the driving operation of the driver is the steering operation, the duration of the steering operation is the time when the input of steering torque equal to or greater than a predetermined threshold value is continued. For example, when the driving operation of the driver is the accelerator operation or the brake operation, the duration of the accelerator operation or the brake operation is the time when a pedal depression amount equal to or greater than a predetermined threshold value is continued. The predetermined threshold value is a value set in advance, and a threshold value for determining the presence or absence of operation intervention of the driver. For example, as the predetermined threshold value, the intervention determination threshold value $T_1$ described in the first embodiment may be used. Furthermore, the predetermined threshold value is set for each of the steering operation, the accelerator operation, and the brake operation. The duration count is a value counted according to the duration of the driving operation. The duration count has a greater value, for example, as the duration of the driving operation increases. A method of calculating the duration count will be described below. When the driving operation is interrupted, a state where steering torque equal to or greater than the predetermined threshold value is not input occurs. In this case, the duration count is reset. The driving operation information acquisition unit 15 outputs the measured duration count to the driving state switching unit 16.

The driving state switching unit 16 switches the driving state of the vehicle V based on the duration count acquired by the driving operation information acquisition unit 15. Hereinafter, a case where the driving state switching unit 16 switches the driving state of the vehicle V based on the duration count of the steering operation as an example of the driving operation will be described.

Figure 7A:
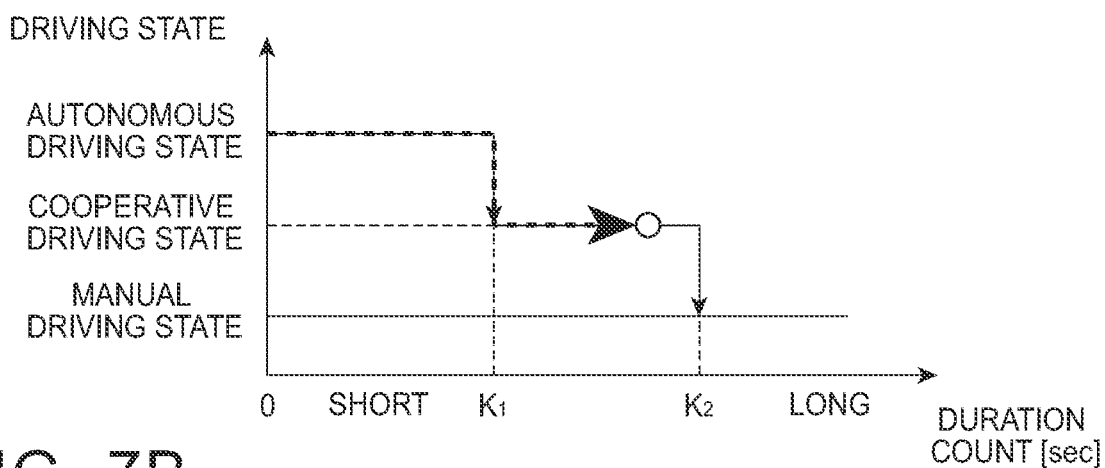
FIG. 7A is a diagram illustrating an example of the relationship between a duration count according to a steering operation and transition of a driving state.
Figure 7B:
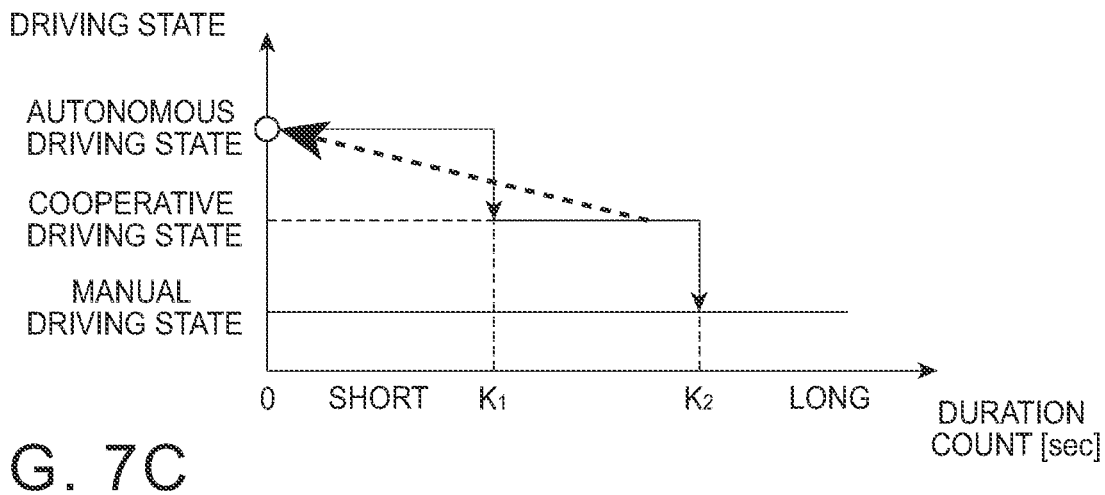
FIG. 7B is a diagram illustrating an example of the relationship between a duration count according to a steering operation and transition of a driving state.
Figure 7C:
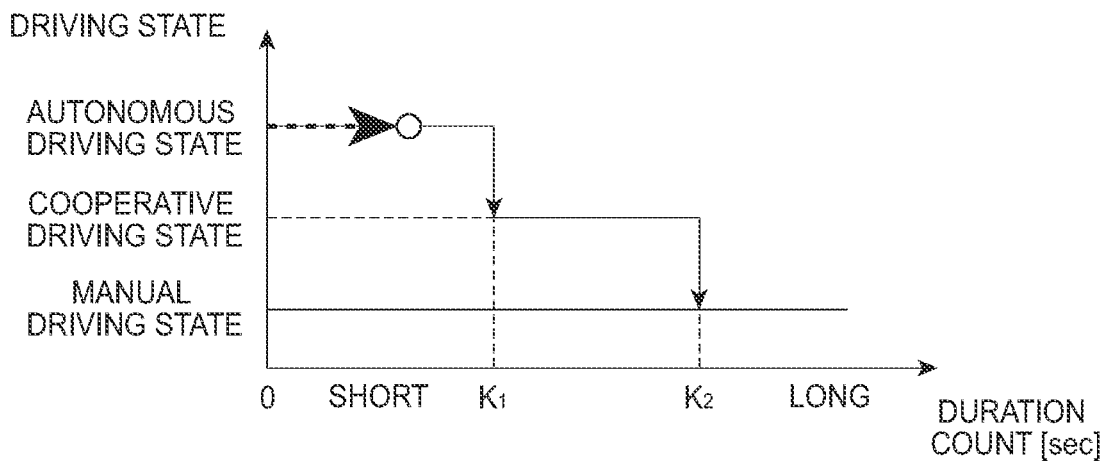
FIG. 7C is a diagram illustrating an example of the relationship between a duration count according to a steering operation and transition of a driving state.

FIGS. 7A to 7C are diagrams illustrating an example of the relationship between the duration count according to the steering operation and transition of the driving state of the vehicle V. The horizontal axis shown in FIG. 7A represents a duration count [sec], and the vertical axis represents a driving state. As shown in FIG. 7A, the driving state of the vehicle V includes three states of an autonomous driving state, a cooperative driving state, and a manual driving state. The contents of the driving states are the same as those in the first embodiment.

The driving state switching unit 16 switches between the autonomous driving state, the cooperative driving state, and the manual driving state based on the duration count according to the steering operation. When the duration count according to the steering operation is less than a first threshold value $K_1$, the driving state of the vehicle V becomes the autonomous driving state. The first threshold value $K_1$ is a value set in advance, and a threshold value which is used in order to determine switching from the autonomous driving state to the cooperative driving state. When the duration count according to the steering operation is equal to or greater than the first threshold value $K_1$ and less than a second threshold value $K_2$, the driving state of the vehicle V becomes the cooperative driving state. The second threshold value $K_2$ is a value set in advance, and a threshold value for determining switching from the cooperative driving state to the manual driving state. When the duration count according to the steering operation is equal to or greater than the second threshold value $K_2$, the driving state of the vehicle V becomes the manual driving state.

Next, the determination (maintenance or transition) of the driving state of the vehicle V will be described. First, the maintenance or transition of the autonomous driving state will be described. The driving state switching unit 16 maintains the driving state of the vehicle V in the autonomous driving state when the driving state of the vehicle V is the autonomous driving state, and when the duration count according to the steering operation is less than the first threshold value $K_1$. With this, for example, even when a driving operation not intending the release of autonomous driving is detected, for example, even when the driver touches the steering wheel unintentionally for a predetermined period, or the like, the autonomous driving state is not released. For this reason, the driving state switching unit 16 can avoid the operation of the autonomous driving ON/OFF switch 70 by the driver in order to instruct autonomous driving start each time the driver releases autonomous driving unintentionally; therefore, it is possible to reduce a burden given to the driver.

The driving state switching unit 16 switches the driving state of the vehicle V to the cooperative driving state when the driving state of the vehicle V is the autonomous driving state and when the duration count according to the steering operation is equal to or greater than the first threshold value $K_1$ and less than the second threshold value $K_2$. With this, for example, when the driver operates the steering wheel with the duration count equal to or greater than the first threshold value $K_1$ and less than the second threshold value $K_2$ in order to intervene in the vehicle V in the autonomous driving state, the driving state of the vehicle V transitions from the autonomous driving state to the cooperative driving state. For example, when an oncoming vehicle of a heavy vehicle type appears during traveling in the autonomous driving state, and when the driver performs the steering operation for a predetermined period such that the vehicle temporarily travels at a position slightly distanced from the heavy vehicle, the driving state of the vehicle V is switched to the cooperative driving state by the driving state switching unit 16. In this case, the vehicle V travels based on the steering operation amount of the driver in a state where system intervention is possible; therefore, it is possible to allow the vehicle V to travel at a position based on the driving operation of the driver.

The driving state switching unit 16 may switch the driving state of the vehicle V to the manual driving state when the driving state of the vehicle V is the autonomous driving state, and when the duration count according to the steering operation is equal to or greater than the second threshold value $K_2$. That is, the driving state of the vehicle V may transition directly from the autonomous driving state to the manual driving state without passing through the cooperative driving state.

Next, the maintenance or transition of the cooperative driving state will be described. The driving state switching unit 16 switches the driving state of the vehicle V from the cooperative driving state to the autonomous driving state when the driving state of the vehicle V is the cooperative driving state, and when the duration count according to the steering operation is less than the first threshold value $K_1$. With this, for example, when the driver performs the driving operation such that the vehicle travels at a position slightly distanced from a heavy vehicle as an oncoming vehicle and the driver stops the driving operation after having passed the oncoming vehicle, the driving state of the vehicle V is switched from the cooperative driving state to the autonomous driving state by the driving state switching unit 16. In this way, when operation intervention is temporary, the driving state is automatically switched to the autonomous driving state based on the duration count according to the steering operation. Therefore, since the driving state switching unit 16 can avoid the operation of the autonomous driving ON/OFF switch 70 of the driver in order to instruct autonomous driving start each time temporary autonomous driving is released, the driving state switching unit 16 can reduce a burden given to the driver.

The driving state switching unit 16 maintains the cooperative driving state when the driving state of the vehicle V is the cooperative driving state, and when the duration count according to the steering operation is maintained equal to or greater than the first threshold value $K_1$ and less than the second threshold value $K_2$. Then, the driving state switching unit 16 switches the driving state of the vehicle V from the cooperative driving state to the manual driving state when the driving state of the vehicle V is the cooperative driving state, and when the duration count according to the steering operation is equal to or greater than the second threshold value $K_2$. With this, the operation amount of the steering operation of the driver is reflected in traveling of the vehicle V in a state where system intervention is not possible.

Next, the maintenance or transition of the manual driving state will be described. The driving state switching unit 16 maintains the driving state in the manual driving state when the driving state of the vehicle V is the manual driving state, and when the duration count according to the steering operation is less than the second threshold value $K_2$. In this case, when the driver performs the steering operation for a long period with the intention of continuing the manual driving state, switching to the autonomous driving state or the cooperative driving state is limited subsequently, for example switching to the autonomous driving state or the cooperative driving state is prohibited or restricted; therefore, it is possible to eliminate the need for the driver to operate the autonomous driving ON/OFF switch 70 in order to instruct autonomous driving end. For this reason, it is possible to reduce a burden given to the driver.

The driving state switching unit 16 maintains the manual driving state until the request operation of autonomous driving start is input to the autonomous driving ON/OFF switch 70 when the driving state of the vehicle V is the manual driving state. That is, even when the duration count according to the steering operation is less than the second threshold value $K_2$, transition to the cooperative driving state or the autonomous driving state is limited until the request operation of autonomous driving start is input. The period during which the manual driving state is continued is not limited thereto, and for example, the driving state switching unit 16 may maintain manual driving for a period determined in advance. The input of the request operation of autonomous driving start is not limited to the autonomous driving ON/OFF switch 70, and known input means can be used.

As described above referring to FIG. 7A, transition between the autonomous driving state and the cooperative driving state is determined by comparing the first threshold value $K_1$ with the duration count based on the steering operation, and is a reversible transition. While transition between the cooperative driving state and the manual driving state is determined by comparing the second threshold value $K_2$ with the duration count based on the steering operation, transition between the cooperative driving state and the manual driving state is an irreversible transition where only transition from the cooperative driving state to the manual driving state is permitted.

Next, additional processing of the duration count according to the steering operation will be described. The additional processing of the duration count according to the steering operation is processing using a generally known increment function. For example, the driving state switching unit 16 performs increment processing for setting the initial value of the duration count according to the steering operation and adding the processing time of the CPU to the initial value or previous value of the duration count at each processing cycle of the CPU in the ECU 10. The driving state switching unit 16 determines whether or not steering torque equal to or greater than a predetermined threshold value is input, and when steering torque is input, performs the additional processing. The additional processing will be described referring to FIG. 7A. FIG. 7A shows a case where the additional processing is performed in the autonomous driving state. An outlined point of FIG. 7A, represented by a circle, indicates the current duration count according to the steering operation at a given point in time. That is, in FIG. 7A, steering torque equal to or greater than a predetermined threshold value is input, and the duration count according to the steering operation is increased by the addition processing. When the duration count according to the steering operation is less than the first threshold value $K_1$, the driving state of the vehicle V is maintained in the autonomous driving state, and when the duration count according to the steering operation is equal to or greater than the first threshold value $K_1$, the driving state of the vehicle V is switched from the autonomous driving state to the cooperative driving state. In this way, the duration count according to the steering operation is increased by the additional processing, and the driving state of the vehicle V is switched.

In regard to the increment processing, increment processing for integrating a predetermined coefficient to the processing time of the CPU and adding the integrated value to the previous value of the duration count according to the steering operation may be performed. Furthermore, the predetermined coefficient may be a cumulative value of steering torque input by the driver equal to or greater than the predetermined threshold value of the driver. In this case, an increase rate of the duration count according to the steering operation can be adjusted by the operation amount according to the steering operation; therefore, the driver can switch the driving state immediately to the manual driving state.

Next, processing of the duration count according to the steering operation when steering torque equal to or greater than the predetermined threshold value is no longer input will be described. When steering torque equal to or greater than the predetermined threshold value is no longer input, the driving state switching unit 16 resets the duration count according to the steering operation to 0. This processing will be described referring to FIGS. 7B and 7C. FIG. 7B shows a case where steering torque equal to or greater than the predetermined threshold value is no longer input after the duration count shown in FIG. 7A. In this case, the duration count according to the steering operation is reset to 0, and the driving state is switched to the autonomous driving state. Thereafter, when steering torque equal to or greater than the predetermined threshold value is input, as shown in FIG. 7C, the duration count is counted from 0.

The driving state switching unit 16 can reset the duration count to 0 and can store the previous value of the duration count according to the steering operation in a storage unit, for example, a memory, when the steering operation is interrupted, and can set the stored previous value as the initial value of the duration count according to the steering operation when the steering operation is resumed. That is, the driving operation information acquisition unit 15 can interrupt counting of the duration count according to the steering operation when the driving operation is interrupted. Alternatively, when the steering operation is interrupted, the driving operation information acquisition unit 15 may store the previous value of the duration count according to the steering operation in the storage unit, may subtract the previous value stored in the storage unit according to the lapse of time, and may set the subtracted previous value as the initial value of the duration count according to the steering operation. That is, the driving operation information acquisition unit 15 can change and set the initial value of the duration count. This setting processing can use a generally known decrement function. For example, decrement processing for subtracting the processing time of the CPU from the previous value of the duration count stored in the storage unit at each processing cycle of the CPU in the ECU 10 is performed. When the previous value of the duration count is 0, the driving operation information acquisition unit 15 does not perform the decrement processing. The driving operation information acquisition unit 15 may perform decrement processing for integrating a predetermined coefficient to the processing time of the CPU and subtracting the integrated value from the previous value of the duration count. With this configuration, it is possible to adjust a decrease rate of the initial value of the duration count.

Figure 8A:
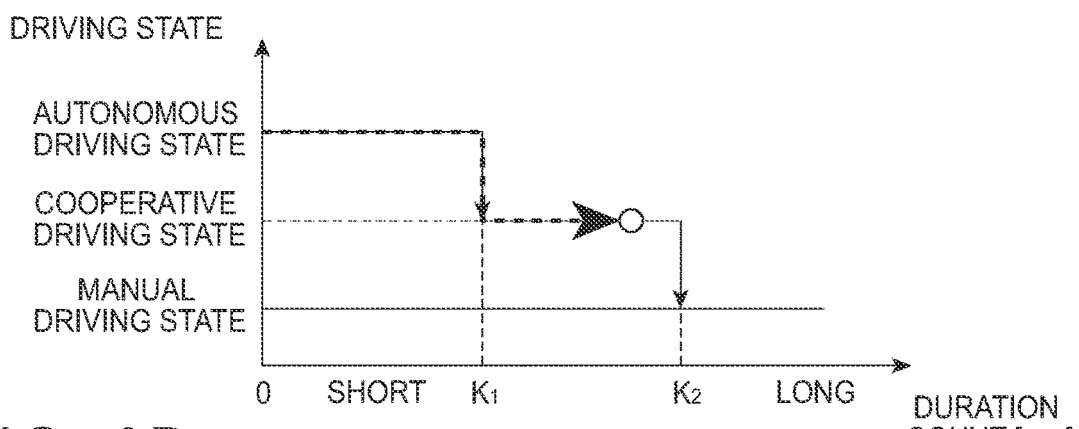
FIG. 8A is a diagram illustrating another example of the relationship between a duration count according to a steering operation and transition of a driving state.
Figure 8B:
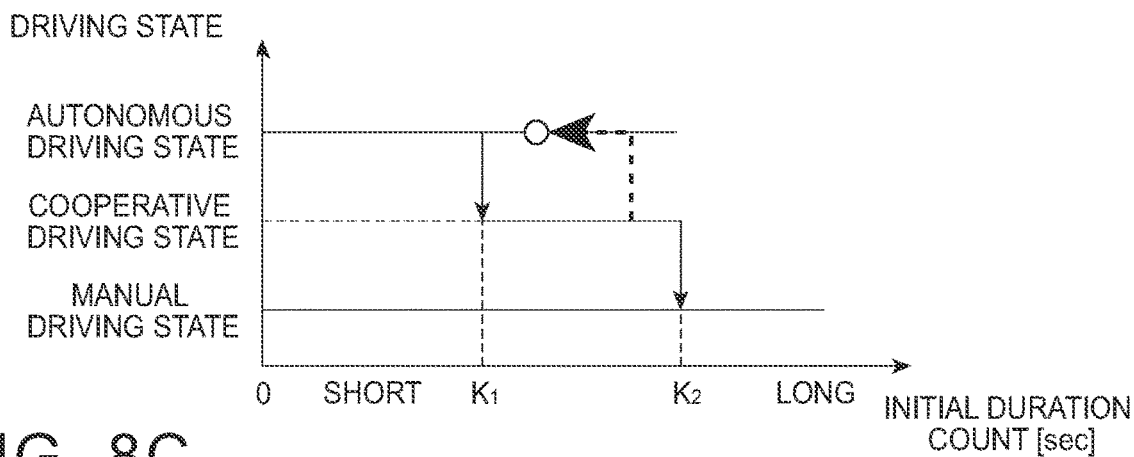
FIG. 8B is a diagram illustrating another example of the relationship between a duration count according to a steering operation and transition of a driving state.
Figure 8C:
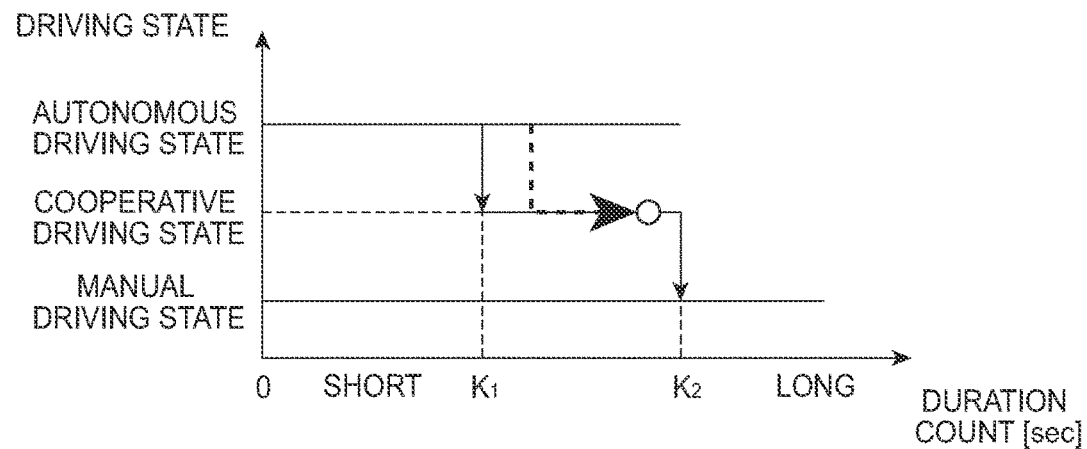
FIG. 8C is a diagram illustrating another example of the relationship between a duration count according to a steering operation and transition of a driving state.

FIGS. 8A to 8C are diagrams illustrating another example of the relationship between the duration count of the driving operation and transition of the driving state of the vehicle V. The horizontal axis shown in FIG. 8A represents a duration count [sec], and the vertical axis represents the driving state of the vehicle V. Similar to FIG. 7A, FIG. 8A shows a case where additional processing is performed in the autonomous driving state. FIG. 8B shows an initial value of a duration count (initial duration count) stored in the storage unit when steering torque equal to or greater than a predetermined threshold value is not input at the duration count shown in FIG. 8A. FIG. 8C shows a duration count when steering torque equal to or greater than the predetermined threshold value is input after FIG. 8B. If steering torque equal to or greater than the predetermined threshold value continues to be input, as shown in FIG. 8A, the duration count is incremented, and the driving state of the vehicle V is switched from the autonomous driving state to the cooperative driving state. Thereafter, when steering torque equal to or greater than the predetermined threshold value is no longer input, the duration count is reset to 0, the driving state is switched to the autonomous driving state, and as shown in FIG. 8B, the initial duration count to be the stored initial value is incremented. Thereafter, when steering torque equal to or greater than the predetermined threshold value is input, as shown in FIG. 8C, the subtracted previous value is set as an initial value, the increment of the duration count is resumed, and the driving state of the vehicle V is switched from the autonomous driving state to the cooperative driving state. In this way, the duration count can be temporarily interrupted. After the duration count is reset, the increment processing is resumed using the previous value, and the duration count in which the intention of the driver to the previous time is reflected can be used; therefore, it is possible to reduce the time until the driving state is switched to the manual driving state compared to a case where the duration count is reset to 0.

Figure 9:
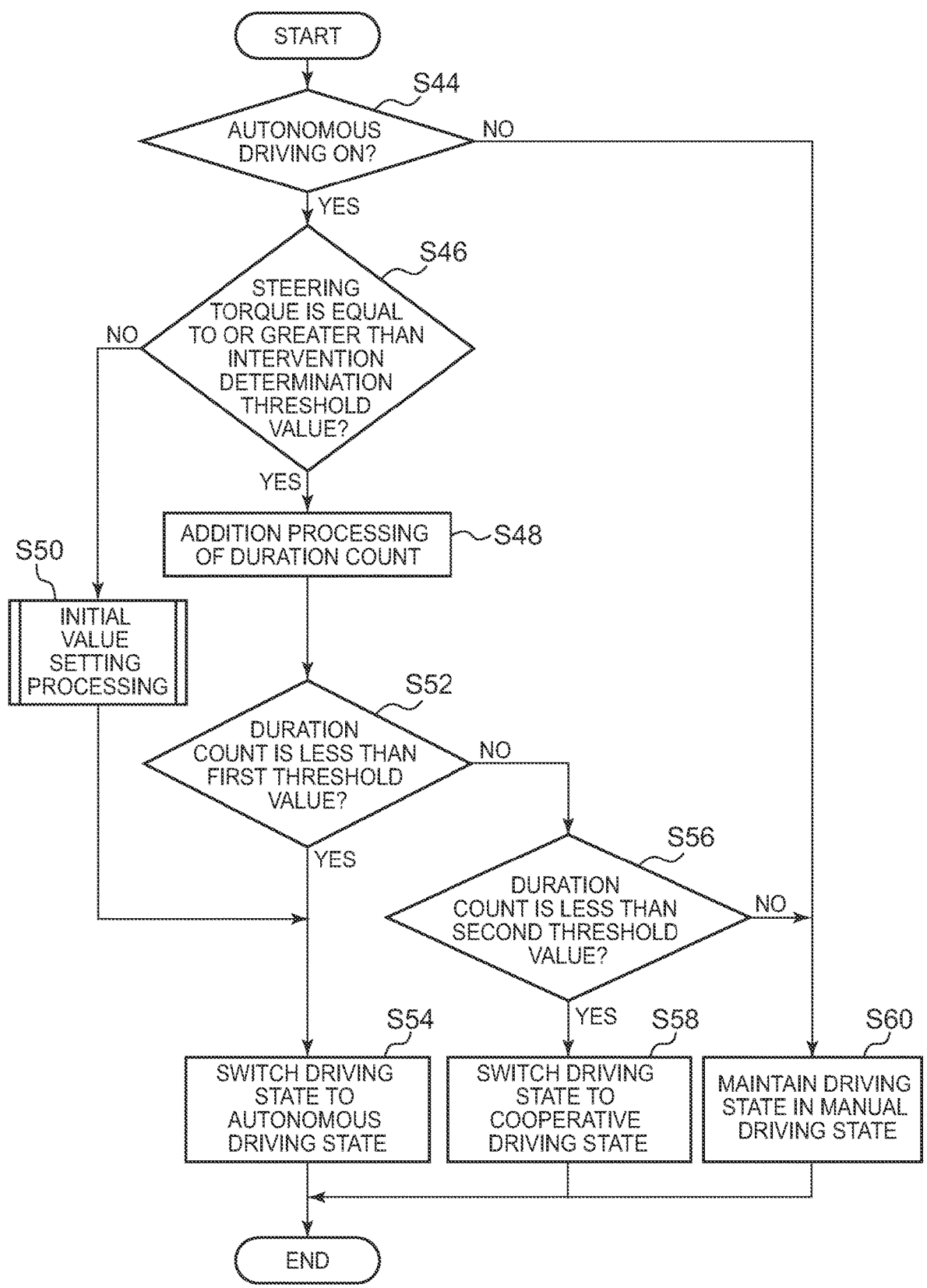
FIG. 9 is a flowchart illustrating an example of switching processing for switching a driving state of a vehicle in a manual driving state using a duration count according to a steering operation.

Next, switching processing of the driving state of the vehicle V which is performed by the autonomous driving vehicle system 100 will be described. FIG. 9 is a flowchart illustrating an example of switching processing for switching the driving state of the vehicle V in the manual driving state using the duration count of the steering operation. Control processing shown in FIG. 9 is repeatedly executed at a predetermined cycle when the vehicle V is in the manual driving state.

As shown in FIG. 9, first, the driving state switching unit 16 determines whether or not the request operation of autonomous driving start is input to the autonomous driving ON/OFF switch 70 when the driving state of the vehicle V is the manual driving state (S44). When it is determined that the request operation of autonomous driving start is input to the autonomous driving ON/OFF switch 70, the driving state switching unit 16 performs determination processing (S46) using the intervention determination threshold value $T_1$.

The driving state switching unit 16 determines whether or not the operation amount (steering torque) based on the detection result of the internal sensor 3 is less than the intervention determination threshold value $T_1$ as the determination processing using the intervention determination threshold value $T_1$ shown in S46. When it is determined that steering torque based on the detection result of the internal sensor 3 is not less than the intervention determination threshold value $T_1$, the driving state switching unit 16 transitions to addition processing (S48) of the duration count.

The driving state switching unit 16 performs processing for increasing the duration count of the steering operation as the addition processing shown in S48. Thereafter, the driving state switching unit 16 determines whether or not the duration count of the steering operation is less than the first threshold value $K_1$ as determination processing using the first threshold value $K_1$ shown in S52. When it is determined that the duration count of the steering operation is less than the first threshold value $K_1$, the driving state switching unit 16 switches the driving state to the autonomous driving state (S54). If the processing shown in S54 ends, the flowchart shown in FIG. 9 ends. The driving state of the vehicle V transitions from the manual driving state to the autonomous driving state, and is no longer in the manual driving state which is a prerequisite for the flowchart shown in FIG. 9; therefore, processing for repeating the flowchart shown in FIG. 9 is not performed subsequently, and a flowchart shown in FIG. 11 described below is started.

When it is determined that the duration count of the steering operation is not less than the first threshold value $K_1$, the driving state switching unit 16 performs determination processing (S56) using the second threshold value $K_2$. The driving state switching unit 16 determines whether or not the duration count of the steering operation is less than the second threshold value $K_2$ as the determination processing using the second threshold value $K_2$ shown in S56. When it is determined that the duration count of the steering operation is less than the second threshold value $K_2$, the driving state switching unit 16 switches the driving state of the vehicle V to the cooperative driving state (S58). If the switching processing shown in S58 ends, the flowchart shown in FIG. 9 ends. The driving state of the vehicle V transitions from the manual driving state to the cooperative driving state, and is no longer in the manual driving state which is a prerequisite for the flowchart shown in FIG. 9; therefore, processing for repeating the flowchart shown in FIG. 9 is not performed subsequently, and the flowchart shown in FIG. 11 described below is started.

When it is determined that the duration count of the steering operation is not less than the second threshold value $K_2$, the driving state switching unit 16 maintains the manual driving state (S60). Similarly, when it is determined that the request operation of autonomous driving start is not input to the autonomous driving ON/OFF switch 70, the driving state switching unit 16 maintains the manual driving state (S60). Then, the flowchart shown in FIG. 9 ends. Since the driving state of the vehicle V does not transition out of the manual driving state, the flowchart shown in FIG. 9 is repeatedly executed subsequently.

In S46, when it is determined that steering torque based on the detection result of the internal sensor 3 is less than the intervention determination threshold value $T_1$, the driving state switching unit 16 transitions to initial value setting processing (S50). In the processing of S50, as the initial value of the duration count, 0, the stored previous value, or the subtracted previous value is input.

Figure 10:
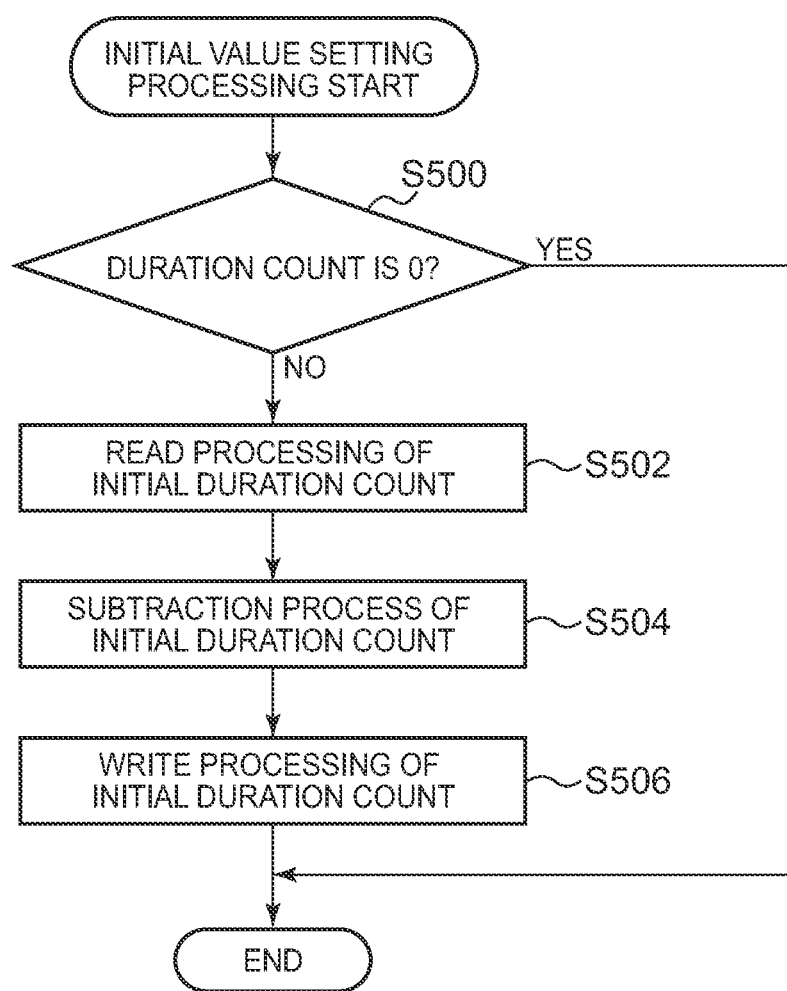
FIG. 10 is a flowchart illustrating initial value setting processing.

Here, a case where the initial value of the duration count is changed will be described in detail. FIG. 10 is a flowchart showing the initial value setting processing of S50. As shown in FIG. 10, first, the driving state switching unit 16 determines whether or not the current duration count is 0 (S500). When it is determined that the duration count is 0, the driving state switching unit 16 ends the flowchart shown in FIG. 10. When it is determined that the duration count is not 0, the driving state switching unit 16 performs read processing (S502) of the initial duration count.

The driving state switching unit 16 reads the initial duration count stored in the storage unit as the read processing of the initial duration count shown in S502. When it is determined that steering torque based on the detection result of the internal sensor 3 is less than the intervention determination threshold value $T_1$, the initial duration count stored in the storage unit is updated by the driving state switching unit 16 with the duration count stored in the storage unit as the initial value. Accordingly, the first time of the read processing shown in S502 becomes processing for reading, as the initial duration count, the duration count when it is determined that steering torque based on the detection result of the internal sensor 3 is less than the intervention determination threshold value $T_1$. Then, subsequent read processing which is continued until it is determined that steering torque based on the detection result of the internal sensor 3 is equal to or greater than the intervention determination threshold value $T_1$ becomes read processing for reading the updated initial duration count (that is, the previous value of the initial duration count) as the initial duration count. If the read processing of the initial duration count is completed, the driving state switching unit 16 transitions to subtraction processing (S504) of the initial duration count.

The driving state switching unit 16 decreases the initial duration count read by the processing of S502 as the subtraction processing of the initial duration count shown in S504. If the subtraction processing of the initial duration count is completed, the driving state switching unit 16 transitions to write processing (S506) of the initial duration count.

The driving state switching unit 16 stores the initial duration count subtracted by the processing of S504 in the storage unit as the write processing of the initial duration count shown in S506. If the write processing of the initial duration count is completed, the driving state switching unit 16 ends the flowchart shown in FIG. 10.

As described above, the flowchart shown in FIG. 10 is executed, whereby the initial duration count is stored and set as the initial value of the duration count at the time of return of the steering operation being interrupted.

Returning to the flowchart of FIG. 9, if the processing of S50 ends, the driving state switching unit 16 switches the driving state of the vehicle V to the autonomous driving state (S54). Then, if the processing shown in S54 ends, the flowchart shown in FIG. 9 ends. The driving state of the vehicle V transitions from the manual driving state to the autonomous driving state, and is no longer in the manual driving state which is a prerequisite for the flowchart shown in FIG. 9; therefore, processing for repeating the flowchart shown in FIG. 9 is not performed subsequently, and the flowchart shown in FIG. 11 described below is started.

Figure 11:
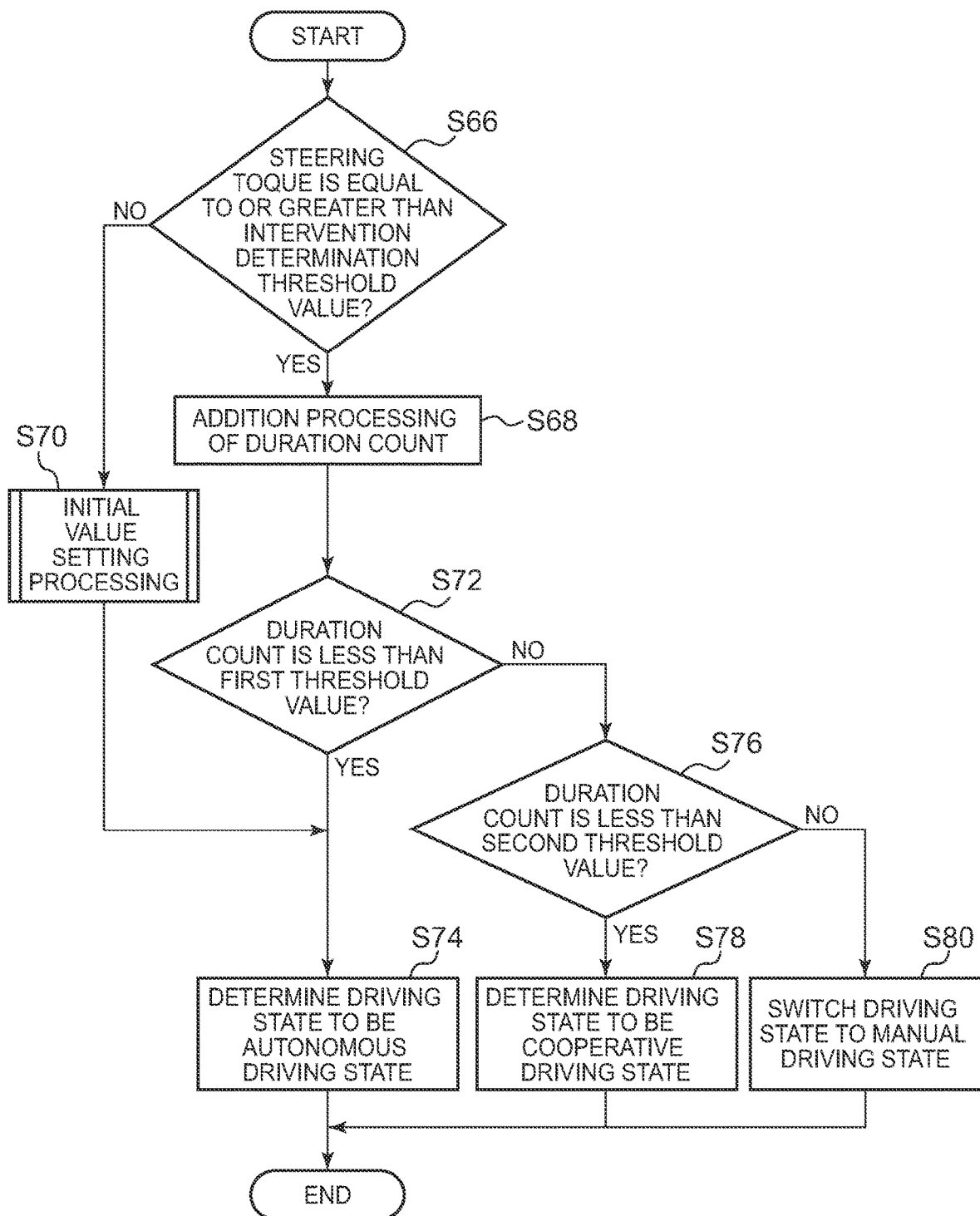
FIG. 11 is a flowchart illustrating an example of switching processing for switching a driving state of a vehicle in an autonomous driving state or a cooperative driving state using a duration count according to a steering operation.

Next, switching processing of the driving state of the vehicle V which is performed by the autonomous driving vehicle system 100 when the driving state of the vehicle V is the autonomous driving state or the cooperative driving state will be described. FIG. 11 is a flowchart illustrating an example of switching processing for switching the driving state of the vehicle V in the autonomous driving state or the cooperative driving state using the duration count of the driving operation. Control processing shown in FIG. 11 is repeatedly executed at a predetermined cycle when the vehicle V is in the autonomous driving state or the cooperative driving state.

As shown in FIG. 11, first, the driving state switching unit 16 determines whether or not an operation amount (torque) based on the detection result of the internal sensor 3 is less than the intervention determination threshold value $T_1$ as determination processing using the intervention determination threshold value $T_1$ shown in S66. When it is determined that torque based on the detection result of the internal sensor 3 is not less than the intervention determination threshold value $T_1$, the driving state switching unit 16 transitions to addition processing (S68) of the duration count.

The driving state switching unit 16 performs processing for increasing the duration count as the addition processing shown in S68. Thereafter, the driving state switching unit 16 determines whether or not the duration count is less than the first threshold value $K_1$ as determination processing using the first threshold value $K_1$ shown in S72. When it is determined that the duration count is less than the first threshold value $K_1$, the driving state switching unit 16 determines the driving state of the vehicle V to be the autonomous driving state (S74). That is, the driving state switching unit 16 maintains the autonomous driving state when the driving state of the vehicle V is the autonomous driving state, and switches the driving state to the autonomous driving state when the driving state of the vehicle V is the cooperative driving state. If the processing shown in S74 ends, the flowchart shown in FIG. 11 ends. Since the driving state of the vehicle V does not transitions to the manual driving state, the flowchart shown in FIG. 11 is repeatedly executed subsequently.

When it is determined that the duration count is not less than the first threshold value $K_1$, the driving state switching unit 16 performs determination processing (S76) using the second threshold value $K_2$. The driving state switching unit 16 determines whether or not the duration count is less than the second threshold value $K_2$ as the determination processing using the second threshold value $K_2$ shown in S76. When it is determined that the duration count is less than the second threshold value $K_2$, the driving state switching unit 16 determines the driving state of the vehicle V to be the cooperative driving state (S78). That is, the driving state switching unit 16 switches the driving state to the cooperative driving state when the driving state of the vehicle V is the autonomous driving state, and maintains the cooperative driving state when the driving state of the vehicle V is the cooperative driving state. If the processing shown in S78 ends, the flowchart shown in FIG. 11 ends. Since the driving state does not transitions to the manual driving state, the flowchart shown in FIG. 11 is repeatedly executed subsequently.

When it is determined that the duration count is not less than the second threshold value $K_2$, the driving state switching unit 16 switches the driving state to the manual driving state (S80). Then, the flowchart shown in FIG. 11 ends. The driving state of the vehicle V transitions from the autonomous driving state or the cooperative driving state to the manual driving state, and is no longer in the autonomous driving state or the cooperative driving state which is a prerequisite for the flowchart shown in FIG. 11; therefore, processing for repeating the flowchart shown in FIG. 11 is not performed subsequently, and the flowchart shown in FIG. 9 is started.

In S66, when it is determined that steering torque based on the detection result of the internal sensor 3 is less than the intervention determination threshold value $T_1$, the driving state switching unit 16 transitions to initial value setting processing (S70). In the processing of S70, as the initial value of the duration count, 0, the stored previous value, or the subtracted previous value is input. The initial value setting processing is the same as the processing of S50, and thus, description thereof will not be repeated.

As shown in FIGS. 9 to 11, the autonomous driving state, the cooperative driving state, and the manual driving state are switched based on the duration count by the driving state switching unit 16. In FIGS. 9 and 11, although a case where, when the driving state is the autonomous driving state or the cooperative driving state, the request operation of autonomous driving end is input after the request operation of autonomous driving start is input to the autonomous driving ON/OFF switch 70 is not shown, in this case, the driving state switching unit 16 performs processing for switching the driving state from the autonomous driving state or the cooperative driving state to the manual driving state.

In the above description, although a case where the driving state switching unit 16 switches the driving state of the vehicle V based on the duration count of the operation amount (steering torque) of the steering operation as an example of the driving operation has been described, steering torque may be replaced with a steering angle, or may be replaced with the depression amount (pedal position) of the accelerator pedal or the brake pedal. That is, the driving state switching unit 16 may switch the driving state of the vehicle V based on the duration count of the steering angle of the steering operation, or may switch the driving state of the vehicle V based on the depression amount of the accelerator pedal or the brake pedal.

As described above, in the autonomous driving vehicle system 100 according to the second embodiment, the driving state is switched to one of the autonomous driving state, the manual driving state, and the cooperative driving state based on the duration count of the driving operation. For example, when an oncoming vehicle of a heavy vehicle type appears during traveling in the autonomous driving state, and the driver performs the driving operation such that the vehicle travels at a position slightly distanced from the heavy vehicle, the driving state of the vehicle V is switched to the cooperative driving state by the driving state switching unit 16 when the duration count is equal to or greater than the first threshold value $K_1$ and less than the second threshold value $K_2$. Then, when the driver stops the driving operation after having passed the oncoming vehicle, the driving state of the vehicle V is switched to the autonomous driving state by the driving state switching unit 16. For this reason, the autonomous driving vehicle system 100 can reduce a burden given to the driver when the driver temporarily intervenes in the vehicle V in the autonomous driving state.

In the autonomous driving vehicle system 100 according to the second embodiment, the duration count according to the the duration is employed, whereby it is possible to realize transition to the manual driving state without inputting a great operation amount. For this reason, it is possible to allow transition to the manual driving state without disturbing the behavior of the vehicle.

Although some exemplary embodiments of the present disclosure have been described, the invention is not limited to the embodiments described above. The invention can be carried out in various forms to which various alterations and improvements are applied based on the knowledge of a person skilled in the art, including the embodiments described above.

Modified Example 1

Figure 12A:
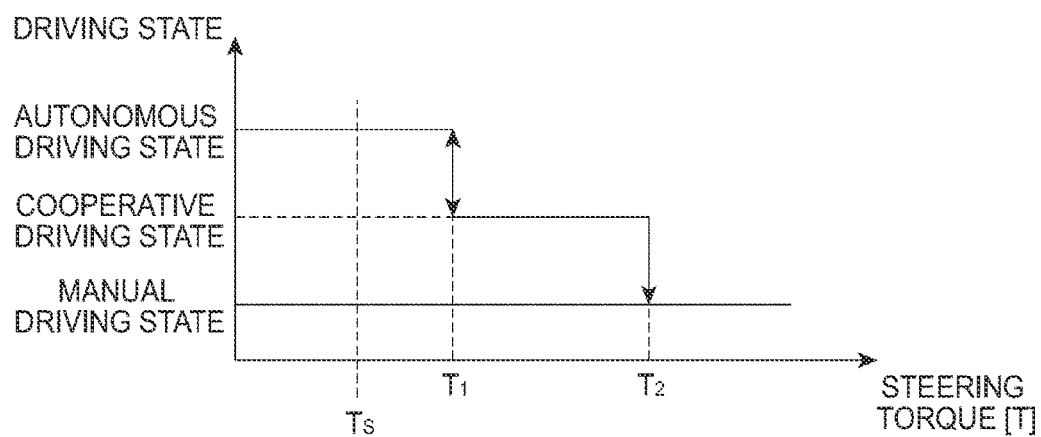
FIG. 12A is a diagram illustrating an example of the relationship of a steering operation and a brake operation with transition of a driving state of a vehicle.
Figure 12B:
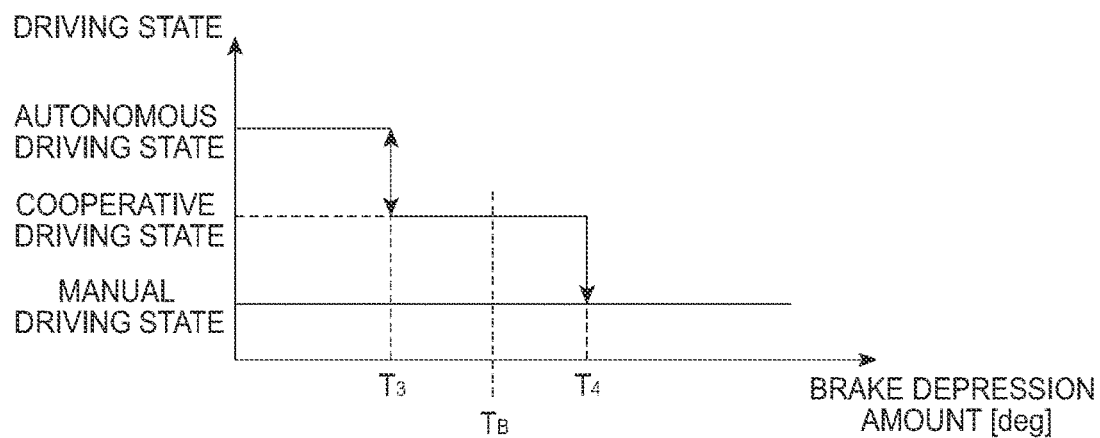
FIG. 12B is a diagram illustrating an example of the relationship of a steering operation and a brake operation with transition of a driving state of a vehicle.

In the embodiments described above, although an example where the driving state is switched based on one operation of the steering operation, the accelerator operation, and the brake operation has been described, the driving state may be switched based on two or more operation amounts. FIGS. 12A and 12B are diagrams illustrating an example of the relationship of the steering operation and the brake operation with transition of the driving state of the vehicle V. The horizontal axis shown in FIG. 12A represents steering torque [T], and the vertical axis represents the driving state of the vehicle V. The horizontal axis shown in FIG. 12B represents a brake depression amount [deg], and the vertical axis represents the driving state of the vehicle V. Here, as shown in FIG. 12A, it is assumed that the detection value of steering torque is $T_S$, and the detection value $T_S$ is less than the intervention determination threshold value $T_1$. As shown in FIG. 12B, it is assumed that the detection value of the brake depression amount is $T_B$, and the detection value $T_B$ is equal to or greater than an intervention determination threshold value $T_3$ and less than a manual driving start threshold value $T_4$. In this case, when determination is performed by steering torque, the driving state is the autonomous driving state, and when determination is performed by the brake depression amount, the driving state becomes the cooperative driving state. In this way, the driving states of the vehicle V corresponding to two or more operation amounts are different.

When the driving state of the vehicle V is the autonomous driving state, and when the driving state corresponding to steering torque is the autonomous driving state and the driving state corresponding to the brake depression amount is the cooperative driving state, the driving state switching unit 16 switches the driving state of the vehicle V to the cooperative driving state. Similarly, when the driving state of the vehicle V is the autonomous driving state, and when the driving state corresponding to steering torque is the cooperative driving state and the driving state corresponding to the brake depression amount is the autonomous driving state, the driving state switching unit 16 switches the driving state of the vehicle V to the cooperative driving state. When the driving state of the vehicle V is the cooperative driving state, and when the driving state corresponding to steering torque is the autonomous driving state and the driving state corresponding to the brake depression amount is the cooperative driving state, the driving state switching unit 16 maintains the driving state of the vehicle V in the cooperative driving state. Similarly, when the driving state of the vehicle V is the cooperative driving state, and when the driving state corresponding to steering torque is the cooperative driving state and the driving state corresponding to the brake depression amount is the autonomous driving state, the driving state switching unit 16 maintains the driving state of the vehicle V in the cooperative driving state. In this way, switching to the cooperative driving state or the maintenance of the cooperative driving state is given priority over the maintenance of the autonomous driving state or switching to the autonomous driving state. That is, in the example of FIGS. 12A and 12B, the driving state of the vehicle V becomes the cooperative driving state.

Additionally, when the driving state of the vehicle V is the cooperative driving state, and when the driving state corresponding to steering torque is the cooperative driving state and the driving state corresponding to the brake depression amount is the manual driving state, the driving state switching unit 16 switches the driving state of the vehicle V to the manual driving state. Similarly, when the driving state of the vehicle V is the cooperative driving state, and when the driving state corresponding to steering torque is the manual driving state and the driving state corresponding to the brake depression amount is the cooperative driving state, the driving state switching unit 16 switches the driving state of the vehicle V to the manual driving state. In this way, switching to the manual driving state is given priority over the maintenance of the cooperative driving state.

According to the autonomous driving vehicle system of Modified Example 1, when the driver performs a steering operation and an accelerator operation, it is possible to avoid switching to the autonomous driving state based on the release of the accelerator operation when the driver performs a steering operation and a temporary accelerator operation with the intention of switching to the manual driving state. That is, it is possible to switch the driving state based on the driving operation in which the intention of the driver is most reflected. In Modified Example 1 described above, although a case where the driving state is switched using the operation amount of the driving operation has been described as an example, the invention can be applied to a case where the driving state is switched using the duration count of the driving operation, and the same effects can be obtained.

Modified Example 2

Figure 13:
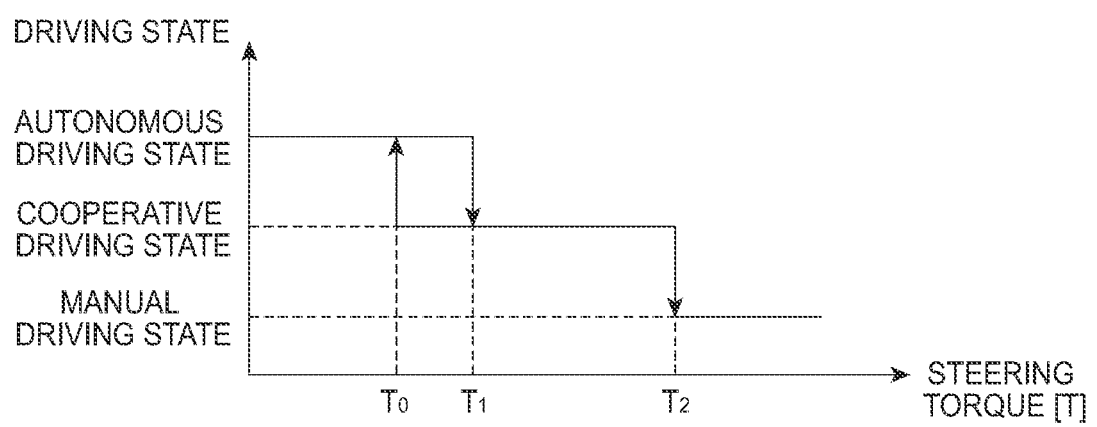
FIG. 13 is a diagram illustrating another example of the relationship between steering torque and transition of a driving state of a vehicle.

In the embodiments described above, although a case where the same threshold value is used as the threshold value for switching from the autonomous driving state to the cooperative driving state and the threshold value for switching from the cooperative driving state to the autonomous driving state has been described, different threshold values may be used. FIG. 13 is a diagram illustrating another example of the relationship between steering torque and transition of the driving state of the vehicle V. As shown in FIG. 13, the threshold value for switching from the autonomous driving state to the cooperative driving state is referred to as $T_1$, and the threshold value for switching from the cooperative driving state to the autonomous driving state can be set to a threshold value $T_0$ (predetermined hysteresis threshold value) smaller than $T_1$. That is, after the driving state of the vehicle V is switched from the autonomous driving state to the cooperative driving state, when the operation amount is less than the intervention determination threshold value $T_1$ but is equal to or greater than the threshold value $T_0$, the driving state is maintained in the cooperative driving state. In this case, it is possible to avoid frequent switching of the state around the threshold value. Specifically, it is possible to avoid frequent switching of the driving state when the operation amount is substantially equal to the intervention determination threshold value $T_1$. In Modified Example 2 described above, although a case where the driving state is switched using the operation amount of the driving operation has been described as an example, the invention can be applied to a case where the driving state is switched using the duration count of the driving operation, and the same effects can be obtained. In this case, after the driving state of the vehicle V is switched from the autonomous driving state to the cooperative driving state, when the duration count based on the operation amount becomes less than the first threshold value but is equal to or greater than a third threshold value, the driving state is maintained in the cooperative driving state. The third threshold value is a predetermined hysteresis duration threshold value, and is a threshold value for switching from the cooperative driving state to the autonomous driving state.

Modified Example 3

Figure 14:
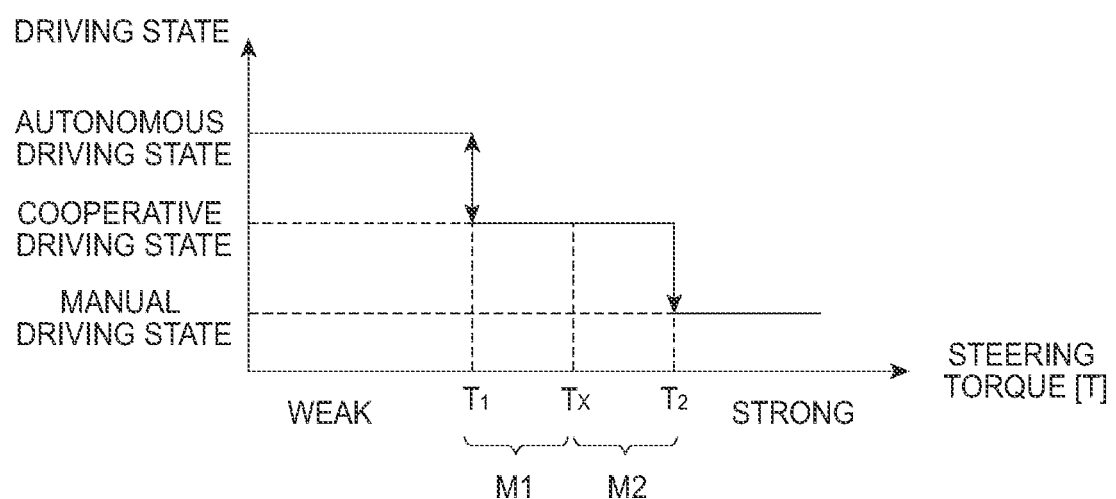
FIG. 14 is a diagram illustrating an example of change of weighting in a cooperative driving state.

In the cooperative driving state of the embodiments described above, cooperative driving may be performed using a value obtained by weighting the operation amount of the driver and the control target value based on the traveling plan. With this setting, since it is possible to change the degree of system intervention in the cooperative driving state, it is possible to perform transition of the driving state in consideration of vehicle behavior. For example, when a control target is steering torque, if steering torque of the driver is $T_D$ and system input torque is $T_S$, target steering torque $T_R$ may be derived using the following numerical expression.

$$T_R = w_1 \cdot T_D + w_2 \cdot T_S \quad (1)$$

where $w_1$ and $w_2$ are weights. The weights $w_1$ and $w_2$ may be constant or variable. The weights $w_1$ and $w_2$ may be changed, for example, according to the speed of the vehicle V. FIG. 14 is a diagram illustrating an example of a change of weighting in the cooperative driving state. In FIG. 14, a threshold value $T_x$ (determination threshold value) is set in a range greater than the intervention determination threshold value $T_1$ and smaller than the manual driving start threshold value $T_2$, and the weights $w_1$ and $w_2$ in a section M1 of the threshold values $T_1$ to $T_x$ are different from the weights $w_1$ and $w_2$ in a section M2 of the threshold values $T_x$ to $T_2$. The determination threshold value is a threshold value for changing weighting of a driver input and a system input in the cooperative driving state according to the operation amount. Here, in the section M1, the control target value based on the traveling plan has a weight set to be greater than the operation amount of the driver ($w_1 < w_2$), and in the section M2, the control target value based on the traveling plan has a weight set to be smaller than the operation amount of the driver ($w_1 > w_2$). In this way, the threshold value may be set to change weighting in the cooperative driving state. In FIG. 14, although an example where one threshold value is provided to change the weights has been described, two or more threshold values may be provided to change the weights.

Modified Example 4

In a further exemplary embodiment, the duration count of the driving operation may be calculated as a continuous duration including any of the steering operation, the accelerator operation, and the brake operation. For example, when the driver performs a steering operation and an accelerator operation in succession, the driving operation information acquisition unit 15 may acquire, as the duration count, a duration beginning from the start of the steering operation, which is equal to or greater than the predetermined threshold value set forth the steering operation, continuing through to the accelerator operation, which is equal to or greater than the predetermined threshold value set for the accelerator operation. That is, as long as one of the driving operations is continuously executed to a degree greater than or equal to its respective predetermined threshold value, the duration count may be extended.

What is claimed is:

1. An autonomous driving vehicle apparatus configured to switch a driving state of a vehicle, comprising:
  an electronic control unit (ECU) including a processor programmed to:
  switch among: (i) an autonomous driving state where traveling of the vehicle is controlled using a traveling plan, (ii) a cooperative driving state where the vehicle is controlled to travel in cooperation between the autonomous driving state, based on the traveling plan, and a manual driving operation of a driver, and (iii) a manual driving state,
  switch the driving state to the cooperative driving state when the driving state is the autonomous driving state and when an operation amount of the driving operation of the driver is equal to or greater than an intervention determination threshold value and less than a manual driving start threshold value, or when a duration count of the driving operation is equal to or greater than a first threshold value and less than a second threshold value, and
  switch the driving state, when the driving state is the cooperative driving state, to the autonomous driving state when the operation amount is less than the intervention determination threshold value or the duration count is less than the first threshold value, and switch the driving state, when the driving state is the cooperative driving state, to the manual driving state when the operation amount is equal to or greater than the manual driving start threshold value, or when the duration count is equal to or greater than the second threshold value,
  wherein, for a particular trip corresponding to the traveling plan, the switch from the autonomous driving state to the cooperative driving state is a reversible transition, and the switch from the cooperative driving state to the manual driving state is an irreversible transition.

2. The autonomous driving vehicle apparatus according to claim 1, wherein the ECU is further programmed to generate the traveling plan along a target route set in advance on a map based on peripheral information detected by an external sensor and map information.

3. The autonomous driving vehicle apparatus according to claim 1, wherein, when a steering wheel of the vehicle rotates during execution of the traveling plan, the ECU is further programmed to acquire a difference between a rotation state detection value of the steering wheel of the vehicle and a control target value of the steering wheel included in the traveling plan as the operation amount.

4. The autonomous driving vehicle apparatus according to claim 1, wherein,
when a pedal position of an accelerator pedal of the vehicle moves during execution of the traveling plan, the ECU is further programmed to acquire a difference between a pedal position detection value of the accelerator pedal of the vehicle and a control target value of the accelerator pedal included in the traveling plan as the operation amount.

5. The autonomous driving vehicle apparatus according to claim 1, wherein,
when a pedal position of a brake pedal of the vehicle moves during execution of the traveling plan, the ECU is further programmed to acquire a difference between a pedal position detection value of the brake pedal of the vehicle and a control target value of the brake pedal included in the traveling plan as the operation amount.

6. The autonomous driving vehicle apparatus according to claim 1, wherein,
when the driving state enters the manual driving state, the ECU is further programmed to maintain the driving state in the manual driving state even when the operation amount becomes less than the manual driving start threshold value, or when the duration count becomes less than the second threshold value.

7. The autonomous driving vehicle apparatus according to claim 1, wherein,
after the driving state is switched from the autonomous driving state to the cooperative driving state, when the operation amount becomes less than the intervention determination threshold value and equal to or greater than a predetermined hysteresis threshold value, or the duration count becomes less than the first threshold value and equal to or greater than a third threshold value, the ECU is further programmed to maintain the driving state in the cooperative driving state.

8. The autonomous driving vehicle apparatus according to claim 1, wherein,
when the driving states corresponding to the operation amounts of two or more of a steering operation, an accelerator operation, and a brake operation of the vehicle are different, or when the driving states corresponding to the duration counts of two or more of the steering operation, the accelerator operation, and the brake operation of the vehicle are different, the ECU is further programmed to give priority to maintaining the cooperative driving state over switching the driving state of the vehicle in the cooperative driving state to the autonomous driving state, and give priority to switching to the manual driving state over maintaining the driving state of the vehicle in the cooperative driving state.

9. The autonomous driving vehicle apparatus according to claim 1, wherein,
when the driving state is the cooperative driving state, cooperative driving is performed using a value obtained by weighting the operation amount and a control target value based on the traveling plan, and a weight of weighting when the operation amount is equal to or greater than a determination threshold value is different from a weight of weighting when the operation amount is less than the determination threshold value.

10. A method of switching a driving state of a vehicle having autonomous driving vehicle control, the method comprising:
switching a driving state among (i) an autonomous driving state where traveling of the vehicle is controlled using a traveling plan, (ii) a cooperative driving state where the vehicle is controlled to travel in cooperation between the autonomous driving state, based on the traveling plan, and a manual driving operation of a driver, and (iii) a manual driving state,
wherein the switching the driving state comprises:
switching the driving state to the cooperative driving state when the driving state is the autonomous driving state and when an operation amount of the driving operation is equal to or greater than an intervention determination threshold value and less than a manual driving start threshold value, or when a duration count of the driving operation is equal to or greater than a first threshold value and less than a second threshold value, and
switching the driving state, when the driving state is the cooperative driving state, to the autonomous driving state when the operation amount is less than the intervention determination threshold value or the duration count is less than the first threshold value, and switching the driving state, when the driving state is the cooperative driving state, to the manual driving state when the operation amount is equal to or greater than the manual driving start threshold value or the duration count is equal to or greater than the second threshold value,
wherein, for a particular trip corresponding to the traveling plan, the switch from the autonomous driving state to the cooperative driving state is a reversible transition and the switch from the cooperative driving state to the manual driving state is an irreversible transition.

11. The method of switching a driving state of a vehicle according to claim 10, further comprising generating the traveling plan along a target route set in advance on a map based on peripheral information detected by an external sensor and map information.

12. The method of switching a driving state of a vehicle according to claim 10, further comprising, when a steering wheel of the vehicle rotates during execution of the traveling plan, acquiring a difference between a rotation state detection value of the steering wheel of the vehicle and a control target value of the steering wheel included in the traveling plan as the operation amount.

13. The method of switching a driving state of a vehicle according to claim 10, further comprising, when a pedal position of an accelerator pedal of the vehicle moves during execution of the traveling plan, acquiring a difference between a pedal position detection value of the accelerator pedal of the vehicle and a control target value of the accelerator pedal included in the traveling plan as the operation amount.

14. The method of switching a driving state of a vehicle according to claim 10, further comprising, when a pedal position of a brake pedal of the vehicle moves during execution of the traveling plan, acquiring a difference between a pedal position detection value of the brake pedal of the vehicle and a control target value of the brake pedal included in the traveling plan as the operation amount.

15. The method of switching a driving state of a vehicle according to claim 10, further comprising, when the driving state enters the manual driving state, maintaining the driving state in the manual driving state even when the operation amount becomes less than the manual driving start threshold value, or when the duration count becomes less than the second threshold value.

16. The method of switching a driving state of a vehicle according to claim 10, further comprising, after the driving state is switched from the autonomous driving state to the cooperative driving state, when the operation amount becomes less than the intervention determination threshold value and equal to or greater than a predetermined hysteresis threshold value, or the duration count becomes less than the first threshold value and equal to or greater than a third threshold value, maintaining the driving state in the cooperative driving state.

17. The method of switching a driving state of a vehicle according to claim 10, further comprising, when the driving states corresponding to the operation amounts of two or more of a steering operation, an accelerator operation, and a brake operation of the vehicle are different, or the driving states corresponding to the duration counts of two or more of the steering operation, the accelerator operation, and the brake operation of the vehicle are different, giving priority to maintaining the cooperative driving state over switching the driving state of the vehicle in the cooperative driving state to the autonomous driving state, and giving priority to switching to the manual driving state over maintaining the driving state of the vehicle in the cooperative driving state.

18. The method of switching a driving state of a vehicle according to claim 10, further comprising, when the driving state is the cooperative driving state, cooperative driving is performed using a value obtained by weighting the operation amount and a control target value based on the traveling plan, and a weight of weighting when the operation amount is equal to or greater than a determination threshold value is different from a weight of weighting when the operation amount is less than the determination threshold value.

19. A non-transitory computer readable medium having stored thereon instructions which, when executed by at least one processor, cause the at least one processor to:
switch a driving state, of a vehicle having autonomous driving vehicle control, among (i) an autonomous driving state where traveling of the vehicle is controlled using a traveling plan, (ii) a cooperative driving state where the vehicle is controlled to travel in cooperation between the autonomous driving state, based on the traveling plan, and a manual driving operation of a driver based on the traveling plan, and (iii) a manual driving state;
switch the driving state to the cooperative driving state when the driving state is the autonomous driving state and when an operation amount of the driving operation is equal to or greater than an intervention determination threshold value and less than a manual driving start threshold value, or when a duration count of the driving operation is equal to or greater than a first threshold value and less than a second threshold value, and
switch the driving state, when the driving state is the cooperative driving state, to the autonomous driving state when the operation amount is less than the intervention determination threshold value or the duration count is less than the first threshold value, and switching the driving state, when the driving state is the cooperative driving state, to the manual driving state when the operation amount is equal to or greater than the manual driving start threshold value or the duration count is equal to or greater than the second threshold value,
wherein, for a particular trip corresponding to the traveling plan, the switch from the autonomous driving state to the cooperative driving state is a reversible transition and the switch from the cooperative driving state to the manual driving state is an irreversible transition.

20. The non-transitory computer readable medium according to claim 19, wherein the at least one processor is caused to generate the traveling plan along a target route set in advance on a map based on peripheral information detected by an external sensor and map information.

* * * * *